US012786433B2

(12) United States Patent
Zhang et al.

(10) Patent No.: US 12,786,433 B2
(45) Date of Patent: Nov. 3, 2026

(54) IMAGE ENCODING AND DECODING METHOD AND APPARATUS

(71) Applicant: Huawei Technologies Co., Ltd., Shenzhen (CN)

(72) Inventors: Yixuan Zhang, Singapore (SG); Shaolin Chen, Shenzhen (CN); Lin Meng, Shenzhen (CN); Junkai Feng, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 592 days.

(21) Appl. No.: 17/993,533

(22) Filed: Nov. 23, 2022

(65) Prior Publication Data

US 2023/0103928 A1 Apr. 6, 2023

Related U.S. Application Data

(63) Continuation of application No. PCT/CN2020/092408, filed on May 26, 2020.

(51) Int. Cl.
*H04N 19/172* (2014.01)
*H04N 19/105* (2014.01)
(Continued)

(52) U.S. Cl.
CPC ......... *H04N 19/172* (2014.11); *H04N 19/105* (2014.11); *H04N 19/117* (2014.11); *H04N 19/187* (2014.11); *H04N 19/463* (2014.11)

(58) Field of Classification Search
CPC .. H04N 19/172; H04N 19/105; H04N 19/117; H04N 19/187; H04N 19/463; H04N 19/164; H04N 19/30; H04N 19/52
See application file for complete search history.

(56) References Cited

U.S. PATENT DOCUMENTS 9,191,671 B2 11/2015 Vanam et al.
2002/0150158 A1* 10/2002 Wu ........................ H04N 19/51 375/240.12

(Continued)

FOREIGN PATENT DOCUMENTS

| | | | |
|---|---|---|---|
| CN | 101360243 | A | 2/2009 |
| CN | 106101709 | A | 11/2016 |
| EP | 2798845 | B1 | 8/2019 |

OTHER PUBLICATIONS

"Series H: Audiovisual and Multimedia Systems, Infrastructure of audiovisual services—Coding of moving video, High Efficiency Video Coding," ITU-T H.265, Oct. 2014, 540 pages.

(Continued)

*Primary Examiner* — Oneal R Mistry
*Assistant Examiner* — Duy Tran
(74) *Attorney, Agent, or Firm* — Conley Rose, P.C.

(57) ABSTRACT

An image encoding and decoding method includes obtaining a to-be-encoded image, where the to-be-encoded image is divided into a base layer and at least one enhancement layer; when feedback information sent by a decoder side is received, determining a reconstructed image corresponding to a frame sequence number and a layer sequence number indicated in the feedback information as a first reference frame, and performing inter encoding on the base layer based on the first reference frame to obtain a bitstream of the base layer; encoding the at least one enhancement layer to obtain a bitstream of the at least one enhancement layer; and sending the bitstream of the base layer and the bitstream of the at least one enhancement layer to the decoder side, where the bitstream of the base layer carries coding reference information.

22 Claims, 12 Drawing Sheets

(51) Int. Cl.
*H04N 19/117* (2014.01)
*H04N 19/187* (2014.01)
*H04N 19/463* (2014.01)

(56) References Cited

U.S. PATENT DOCUMENTS

| | | | | |
|---|---|---|---|---|
| 2006/0233263 | A1* | 10/2006 | Park | H04N 19/46 348/E5.111 |
| 2009/0060035 | A1* | 3/2009 | He | H04N 19/31 375/E7.243 |
| 2011/0085602 | A1 | 4/2011 | He | |
| 2011/0268186 | A1* | 11/2011 | Mukherjee | H04N 19/187 375/240.07 |
| 2013/0223524 | A1* | 8/2013 | Lu | H04N 19/58 375/E7.243 |
| 2014/0192860 | A1* | 7/2014 | Onno | H04N 19/86 375/240.02 |

OTHER PUBLICATIONS

J. Ott et al., Extended RTP Profile for Real-time Transport Control Protocol (RTCP)-Based Feedback (RTP/AVPF), RFC 4585, Jul. 2006, total 50 pages.

* cited by examiner

IMAGE ENCODING AND DECODING METHOD AND APPARATUS

CROSS-REFERENCE TO RELATED APPLICATIONS

This is a continuation of International Patent Application No. PCT/CN2020/092408 filed on May 26, 2020, the disclosure of which is hereby incorporated by reference in its entirety.

TECHNICAL FIELD

This disclosure relates to image encoding and decoding technologies, and in particular, to an image encoding and decoding method and apparatus.

BACKGROUND

A wireless projection technology is a technology for projecting, through encoding, compression, and wireless transmission, video data (for example, a game image rendered by a graphics processing unit (GPU)) generated by a device with a strong processing capability on a device (for example, a television or a virtual reality (VR) helmet) with a weak processing capability and good display effect. An application using the wireless projection technology, for example, game projection or VR glasses, provides interaction, and therefore requires an extremely low transmission latency. To avoid an image quality problem caused by a data loss, anti-interference is also an important requirement of such application. In addition, a larger data amount indicates higher transmission power consumption. Therefore, it is also important to improve video compression efficiency and reduce transmission power consumption.

In the Scalable Video Coding (SVC) protocol, an image frame in a source video is encoded into a plurality of image layers. The plurality of image layers corresponds to different quality or resolution, and the plurality of image layers mutually refer to each other. During transmission, related data is transmitted according to a sequence from a base layer, a low-quality/low-resolution image layer, to a high-quality/high-resolution image layer. More image layer data for one image frame received by a decoder indicates better quality of a reconstructed image. In this technology, a transmission bit rate can more easily match a changeable bandwidth, without switching a bitstream. This avoids a delay caused by bitstream switching.

However, in the foregoing technology, determining a reference frame for coding for each image layer is computing-intensive, and quality of a reconstructed image deteriorates as an image layer is lost.

SUMMARY

This disclosure provides an image encoding and decoding method and apparatus, to improve quality or resolution of a current image frame.

According to a first aspect, this disclosure provides an image encoding method, including obtaining a to-be-encoded image, where the to-be-encoded image is divided into a base layer and at least one enhancement layer, when feedback information sent by a decoder side is received, determining a reconstructed image corresponding to a frame sequence number and a layer sequence number indicated in the feedback information as a first reference frame, and performing inter encoding on the base layer based on the first reference frame to obtain a bitstream of the base layer, encoding the at least one enhancement layer to obtain a bitstream of the at least one enhancement layer, and sending the bitstream of the base layer and the bitstream of the at least one enhancement layer to the decoder side, where the bitstream of the base layer carries coding reference information, and the coding reference information includes a frame sequence number and a layer sequence number of the first reference frame.

In an existing solution (for example, the SVC protocol or the Scalable High-Efficiency Video Coding (SHVC) protocol), only a reconstructed image corresponding to a base layer of a preceding $n^{th}$ image frame may be used as a reference for the base layer, and n is a positive integer greater than or equal to 1. It should be understood that the preceding $n^{th}$ image frame indicates an image frame preceding a to-be-encoded image. In the preceding $n^{th}$ image frame, an image layer (for example, any enhancement layer) higher than the base layer corresponds to a reconstructed image having higher quality or resolution than quality or resolution of the reconstructed image corresponding to the base layer. However, the reconstructed image corresponding to the any enhancement layer cannot be used as a reference frame for the base layer. This results in low quality of the bitstream obtained by encoding the base layer, low quality or resolution of a reconstructed image obtained based on this, and even low quality or resolution of a reconstructed image obtained by the decoder side through decoding based on this. In this disclosure, an encoder side obtains, based on the feedback information from the decoder side, an image layer of an image frame that has highest quality or resolution and that can be obtained by the decoder side. The encoder side uses a reconstructed image corresponding to the image layer as a reference frame for the base layer. In other words, when the encoder side encodes the base layer, inter encoding is performed by referring to a reconstructed image corresponding to an image layer that has highest quality or resolution in the preceding $n^{th}$ image frame and that is successfully decoded, successfully received, or to be decoded by the decoder side. The image layer is also a highest image layer that meets a network transmission status and a bit rate requirement and that is fed back by the decoder side. Therefore, an encoding layer uses the reconstructed image corresponding to the image layer as a reference frame to perform inter encoding on the base layer. This can improve quality of a bitstream obtained by encoding the base layer, improve quality or resolution of a reconstructed image obtained based on the bitstream, and even improve quality or resolution of a reconstructed image obtained by the decoder side by decoding the bitstream of the base layer, thereby improving quality or resolution of the current image frame.

In addition, in an existing solution (for example, the SVC protocol or the SHVC protocol), feedback is not required for each image frame or sub-image frame. Therefore, an image error or error transmission may occur, and periodic correction needs to be performed by periodically inserting an intra encoding frame. In this disclosure, the decoder side may perform feedback for each image frame or sub-image frame. This avoids error transmission and improves image quality. This further avoids periodically inserting an intra encoding frame and lowering a bit rate.

In a possible implementation, the to-be-encoded image is an entire image frame or one sub-image in an entire image frame.

In a possible implementation, when the to-be-encoded image is the one sub-image in the entire image frame, the feedback information further includes location information. The location information indicates a location of the to-be-encoded sub-image in the entire image frame.

In a possible implementation, the frame sequence number indicates a preceding $n^{th}$ image frame of the to-be-encoded image, and n is a positive integer. The layer sequence number corresponds to an image layer that has highest quality or resolution and that is successfully decoded by the decoder side from a bitstream of the preceding $n^{th}$ image frame of the to-be-encoded image. Alternatively, the layer sequence number corresponds to an image layer that has highest quality or resolution and that is successfully received by the decoder side from a bitstream of the preceding $n^{th}$ image frame of the to-be-encoded image. Alternatively, the layer sequence number corresponds to an image layer that is determined by the decoder side to have highest quality or resolution and that is to be decoded from a bitstream of the preceding $n^{th}$ image frame of the to-be-encoded image.

In an existing solution (for example, the SVC protocol or the SHVC protocol), only a reconstructed image corresponding to a base layer of a preceding $n^{th}$ image frame may be used as a reference for the base layer, and n is a positive integer greater than or equal to 1. It should be understood that the preceding $n^{th}$ image frame indicates an image frame preceding a to-be-encoded image. In the preceding $n^{th}$ image frame, an image layer (for example, any enhancement layer) higher than the base layer corresponds to a reconstructed image having higher quality or resolution than quality or resolution of the reconstructed image corresponding to the base layer. However, the reconstructed image corresponding to the any enhancement layer cannot be used as a reference frame for the base layer. This results in low quality of the bitstream obtained by encoding the base layer, low quality or resolution of a reconstructed image obtained based on this, and even low quality or resolution of a reconstructed image obtained by the decoder side through decoding based on this. In this disclosure, the encoder side obtains, based on the feedback information from the decoder side, an image layer of an image frame that has highest quality or resolution and that can be obtained by the decoder side. The encoder side uses a reconstructed image corresponding to the image layer as a reference frame for the base layer. In other words, when the encoder side encodes the base layer, inter encoding is performed by referring to a reconstructed image corresponding to an image layer that has highest quality or resolution in the preceding $n^{th}$ image frame and that is successfully decoded, successfully received, or to be decoded by the decoder side. Feedback from the decoder side usually also reflects a network transmission status, in other words, an image layer whose transmission requirement and bit rate are met by a current network status. Therefore, the encoding layer uses the reconstructed image corresponding to the image layer as a reference frame to perform inter encoding on the base layer, providing a good reference for a related region (for example, a static region) of the to-be-encoded image. This can improve quality of a bitstream obtained by encoding the base layer, improve quality or resolution of a reconstructed image obtained based on the bitstream, and even improve quality or resolution of a reconstructed image obtained by the decoder side by decoding the bitstream of the base layer, thereby improving quality or resolution of the current image frame.

In a possible implementation, after obtaining a to-be-encoded image, the method further includes, when the feedback information is not received or the feedback information includes identification information indicating a receiving failure or a decoding failure, performing inter encoding on the base layer based on a third reference frame. The third reference frame is a reference frame for a base layer of a previous image frame of the to-be-encoded image.

In this disclosure, because a change between adjacent image frames in a video is very small, even if latest feedback information cannot be received due to a network factor, a previous image frame may be used as a reference, and quality or resolution of the current image frame is not greatly affected.

In a possible implementation, after obtaining a to-be-encoded image, the method further includes, when the feedback information is not received or the feedback information includes identification information indicating a receiving failure or a decoding failure, performing intra encoding on the base layer.

In a possible implementation, the encoding the at least one enhancement layer to obtain a bitstream of the at least one enhancement layer includes performing inter encoding on a first enhancement layer based on a second reference frame to obtain a bitstream of the first enhancement layer. The first enhancement layer is any one of the at least one enhancement layer. The second reference frame is a reconstructed image corresponding to a first image layer. The first image layer has lower quality or resolution than quality or resolution of the first enhancement layer.

In an existing solution (for example, the SVC protocol or the SHVC protocol), a reconstructed image corresponding to a same image layer of a preceding $n^{th}$ image frame and a reconstructed image corresponding to a lower image layer of the same image frame are simultaneously used as references for an enhancement layer. In other words, for any enhancement layer, a reconstructed image corresponding to a same image layer of a preceding $n^{th}$ image frame needs to be used as a reference to provide a good reference for a related region (for example, a static region) to be encoded, and a reconstructed image corresponding to a lower image layer of the same image frame needs to be used as a reference to provide a good reference for a cover region to be encoded. However, a related processing process of the two reference frames increases a calculation amount. In addition, when a reference frame for an enhancement layer can only be a reconstructed image corresponding to a same image layer of a preceding $n^{th}$ image frame and a reconstructed image corresponding to a lower image layer of the same image frame, quality or resolution of the enhancement layer is limited. In this disclosure, a base layer is used as a reference for any enhancement layer. As described above, the base layer is encoded by referring to an image layer that has highest quality or resolution in a preceding $n^{th}$ image frame and that is successfully decoded, successfully received, or to be decoded by the decoder side. This has improved quality or resolution of the base layer, further improves quality of a bitstream obtained by encoding the enhancement layer by referring to the base layer, and may further improve quality or resolution of a reconstructed image obtained based on the bitstream, and even quality or resolution of a reconstructed image obtained by the decoder side by decoding the bitstream of the base layer. If an enhancement layer is used as a reference, and a base layer is also directly or indirectly used as a reference for the enhancement layer, quality of a bitstream obtained by encoding the enhancement layer may be improved, quality or resolution of a reconstructed image obtained based on the bitstream may also be improved, and even quality or resolution of a reconstructed image obtained by the decoder side by decoding the bitstream of the base layer may be improved. Therefore, when a good reference is provided for a related region (for example, a static region)

to be encoded during encoding the base layer, a low image layer is used as a reference frame for a high image layer of a same image frame. This may further provide a reference for a cover region, and finally improve quality or resolution of the high image layer. In addition, only a reconstructed image corresponding to a lower image layer is used as a reference for an enhancement layer of a same image frame. This reduces a calculation amount.

In a possible implementation, the first image layer is an image layer lower than the first enhancement layer, or the first image layer is the base layer.

In a possible implementation, a low-rate modulation and coding scheme (MCS) is used for the base layer and a low enhancement layer, so that user equipment with a poor channel can obtain a basic video service. A high-rate MCS is used for a high enhancement layer, so that user equipment with a good channel can obtain a video service having higher quality and higher resolution.

In a possible implementation, in the process of encoding the at least one enhancement layer to obtain a bitstream of the at least one enhancement layer, the method further includes buffering reconstructed images respectively corresponding to the base layer and the at least one enhancement layer.

In a possible implementation, before determining a reconstructed image corresponding to a frame sequence number and a layer sequence number indicated in the feedback information as a first reference frame when feedback information sent by a decoder side is received, the method further includes monitoring the feedback information within specified duration, and if the feedback information is received within the specified duration, determining that the feedback information is received.

In this disclosure, if the encoder side has not received the feedback information within the specified duration, it is considered that the feedback information is not received. In this case, the encoder side does not continue to monitor the feedback information. This avoids unnecessary waiting, reduces consumption, and prevents received invalid feedback information from being processed as useful information, thereby preventing the encoder side from incorrectly determining a reference frame.

According to a second aspect, this disclosure provides an image decoding method, including receiving, from an encoder side, a bitstream of a base layer and a bitstream of at least one enhancement layer of a to-be-decoded image, where the bitstream of the base layer carries coding reference information, and the coding reference information includes a first frame sequence number and a first layer sequence number, determining a first reference frame based on the first frame sequence number and the first layer sequence number, and performing inter decoding on the bitstream of the base layer based on the first reference frame to obtain a reconstructed image corresponding to the base layer, decoding the bitstream of the at least one enhancement layer to obtain a reconstructed image corresponding to the at least one enhancement layer, and sending feedback information to the encoder side, where the feedback information includes a second frame sequence number and a second layer sequence number, the second frame sequence number corresponds to the to-be-decoded image, and the second layer sequence number corresponds to an image layer having highest quality or resolution in the base layer and the at least one enhancement layer of the to-be-decoded image.

In a possible implementation, the to-be-decoded image is an entire image frame or one sub-image in an entire image frame.

In a possible implementation, when the to-be-decoded image is the one sub-image in the entire image frame, the feedback information further includes location information. The location information indicates a location of the to-be-decoded image in the entire image frame.

In a possible implementation, that the second layer sequence number corresponds to an image layer having highest quality or resolution in the base layer and the at least one enhancement layer of the to-be-decoded image further includes that the second layer sequence number corresponds to an image layer that has highest quality or resolution and that is successfully decoded from the bitstream of the base layer and the bitstream of the at least one enhancement layer of the to-be-decoded image, the second layer sequence number corresponds to an image layer that has highest quality or resolution and that is successfully received from the bitstream of the base layer and the bitstream of the at least one enhancement layer of the to-be-decoded image, or the second layer sequence number corresponds to an image layer that is currently determined to have highest quality or resolution and that is to be decoded from the bitstream of the base layer and the bitstream of the at least one enhancement layer of the to-be-decoded image.

In a possible implementation, the method further includes, when both the bitstream of the base layer and the bitstream of the at least one enhancement layer fail to be received, the feedback information includes identification information indicating a receiving failure. Alternatively, when the bitstream of the base layer and/or the bitstream of the at least one enhancement layer fail/fails to be decoded, the feedback information includes identification information indicating a decoding failure.

In a possible implementation, after sending feedback information to the encoder side, the method further includes obtaining the to-be-decoded image based on the reconstructed image corresponding to the base layer and the reconstructed image corresponding to the at least one enhancement layer.

In a possible implementation, the decoding the bitstream of the at least one enhancement layer to obtain a reconstructed image corresponding to the at least one enhancement layer includes performing inter decoding on a bitstream of a first enhancement layer based on a second reference frame to obtain a reconstructed image corresponding to the first enhancement layer. The first enhancement layer is any one of the at least one enhancement layer. The second reference frame is a reconstructed image corresponding to a first image layer. The first image layer has lower quality or resolution than quality or resolution of the first enhancement layer.

In a possible implementation, the first image layer is an image layer lower than the first enhancement layer, or the first image layer is the base layer.

In a possible implementation, when the feedback information includes frame sequence numbers and layer sequence numbers of all image layers that are successfully decoded, to be decoded, or successfully received, reconstructed images corresponding to all the image layers are buffered. Alternatively, when the feedback information includes a frame sequence number and a layer sequence number of an image layer that has highest quality or resolution and that is successfully decoded, to be decoded, or successfully received, a reconstructed image corresponding to the image layer that has highest quality or resolution and that is successfully decoded, to be decoded, or successfully received is buffered.

In a possible implementation, after receiving, from an encoder side, a bitstream of a base layer and a bitstream of at least one enhancement layer of a to-be-decoded image, the method further includes, when the bitstream of the base layer and/or the bitstream of the at least one enhancement layer include/includes coding scheme indication information, decoding a corresponding image layer according to a scheme indicated in the coding scheme indication information. The scheme indicated in the coding scheme indication information includes intra decoding or inter decoding.

According to a third aspect, this disclosure provides an encoding apparatus, including a receiving module, an encoding module, and a sending module. The receiving module is configured to obtain a to-be-encoded image, where the to-be-encoded image is divided into a base layer and at least one enhancement layer. The encoding module is configured to, when feedback information sent by a decoder side is received, determine a reconstructed image corresponding to a frame sequence number and a layer sequence number indicated in the feedback information as a first reference frame, perform inter encoding on the base layer based on the first reference frame to obtain a bitstream of the base layer, and encode the at least one enhancement layer to obtain a bitstream of the at least one enhancement layer. The sending module is configured to send the bitstream of the base layer and the bitstream of the at least one enhancement layer to the decoder side, where the bitstream of the base layer carries coding reference information, and the coding reference information includes a frame sequence number and a layer sequence number of the first reference frame.

In a possible implementation, the to-be-encoded image is an entire image frame or one sub-image in an entire image frame.

In a possible implementation, when the to-be-encoded image is the one sub-image in the entire image frame, the feedback information further includes location information. The location information indicates a location of the to-be-encoded sub-image in the entire image frame.

In a possible implementation, the frame sequence number indicates a preceding $n^{th}$ image frame of the to-be-encoded image, and n is a positive integer. The layer sequence number corresponds to an image layer that has highest quality or resolution and that is successfully decoded by the decoder side from a bitstream of the preceding $n^{th}$ image frame of the to-be-encoded image. Alternatively, the layer sequence number corresponds to an image layer that has highest quality or resolution and that is successfully received by the decoder side from a bitstream of the preceding $n^{th}$ image frame of the to-be-encoded image. Alternatively, the layer sequence number corresponds to an image layer that is determined by the decoder side to have highest quality or resolution and that is to be decoded from a bitstream of the preceding $n^{th}$ image frame of the to-be-encoded image.

In a possible implementation, the processing module is further configured to, when the feedback information is not received or the feedback information includes identification information indicating a receiving failure or a decoding failure, perform inter encoding on the base layer based on a third reference frame. The third reference frame is a reference frame for a base layer of a previous image frame of the to-be-encoded image.

In a possible implementation, the processing module is further configured to, when the feedback information is not received or the feedback information includes identification information indicating a receiving failure or a decoding failure, perform intra encoding on the base layer.

In a possible implementation, the encoding module is further configured to perform inter encoding on a first enhancement layer based on a second reference frame to obtain a bitstream of the first enhancement layer. The first enhancement layer is any one of the at least one enhancement layer. The second reference frame is a reconstructed image corresponding to a first image layer. The first image layer has lower quality or resolution than quality or resolution of the first enhancement layer.

In a possible implementation, the first image layer is an image layer lower than the first enhancement layer, or the first image layer is the base layer.

In a possible implementation, the apparatus further includes a processing module configured to buffer reconstructed images respectively corresponding to the base layer and the at least one enhancement layer.

In a possible implementation, the processing module is further configured to monitor the feedback information within specified duration, and if the feedback information is received within the specified duration, determine that the feedback information is received.

According to a fourth aspect, this disclosure provides a decoding apparatus, including a receiving module, a decoding module, and a sending module. The receiving module is configured to receive, from an encoder side, a bitstream of a base layer and a bitstream of at least one enhancement layer of a to-be-decoded image, where the bitstream of the base layer carries coding reference information, and the coding reference information includes a first frame sequence number and a first layer sequence number. The decoding module is configured to determine a first reference frame based on the first frame sequence number and the first layer sequence number, perform inter decoding on the bitstream of the base layer based on the first reference frame to obtain a reconstructed image corresponding to the base layer, and decode the bitstream of the at least one enhancement layer to obtain a reconstructed image corresponding to the at least one enhancement layer. The sending module is configured to send feedback information to the encoder side, where the feedback information includes a second frame sequence number and a second layer sequence number, the second frame sequence number corresponds to the to-be-decoded image, and the second layer sequence number corresponds to an image layer having highest quality or resolution in the base layer and the at least one enhancement layer of the to-be-decoded image.

In a possible implementation, the to-be-decoded image is an entire image frame or one sub-image in an entire image frame.

In a possible implementation, when the to-be-decoded image is the one sub-image in the entire image frame, the feedback information further includes location information. The location information indicates a location of the to-be-decoded image in the entire image frame.

In a possible implementation, that the second layer sequence number corresponds to an image layer having highest quality or resolution in the base layer and the at least one enhancement layer of the to-be-decoded image further includes that the second layer sequence number corresponds to an image layer that has highest quality or resolution and that is successfully decoded from the bitstream of the base layer and the bitstream of the at least one enhancement layer of the to-be-decoded image, the second layer sequence number corresponds to an image layer that has highest quality or resolution and that is successfully received from the bitstream of the base layer and the bitstream of the at least one enhancement layer of the to-be-decoded image, or the second layer sequence number corresponds to an image layer that is currently determined to have highest quality or resolution and that is to be decoded from the bitstream of the base layer and the bitstream of the at least one enhancement layer of the to-be-decoded image.

In a possible implementation, when both the bitstream of the base layer and the bitstream of the at least one enhancement layer fail to be received, the feedback information includes identification information indicating a receiving failure. Alternatively, when the bitstream of the base layer and/or the bitstream of the at least one enhancement layer fail/fails to be decoded, the feedback information includes identification information indicating a decoding failure.

In a possible implementation, the decoding module is further configured to obtain the to-be-decoded image based on the reconstructed image corresponding to the base layer and the reconstructed image corresponding to the at least one enhancement layer.

In a possible implementation, the decoding module is further configured to perform inter decoding on a bitstream of any image layer based on a second reference frame to obtain a reconstructed image corresponding to the first enhancement layer. The first enhancement layer is any one of the at least one enhancement layer. The second reference frame is a reconstructed image corresponding to a first image layer. The first image layer has lower quality or resolution than quality or resolution of the any image layer.

In a possible implementation, the first image layer is an image layer lower than the first enhancement layer, or the first image layer is the base layer.

In a possible implementation, the apparatus further includes a processing module. The processing module is configured to, when the feedback information includes frame sequence numbers and layer sequence numbers of all image layers that are successfully decoded, to be decoded, or successfully received, buffer reconstructed images corresponding to all the image layers, or when the feedback information includes a frame sequence number and a layer sequence number of an image layer that has highest quality or resolution and that is successfully decoded, to be decoded, or successfully received, buffer a reconstructed image corresponding to the image layer that has highest quality or resolution and that is successfully decoded, to be decoded, or successfully received.

In a possible implementation, the decoding module is further configured to, when the bitstream of the base layer and/or the bitstream of the at least one enhancement layer include/includes coding scheme indication information, decode a corresponding image layer according to a scheme indicated in the coding scheme indication information. The scheme indicated in the coding scheme indication information includes intra decoding or inter decoding.

According to a fifth aspect, this disclosure provides an encoder, including a processor and a transmission interface.

The processor is configured to invoke program instructions stored in a memory, to implement the method according to any one of the first aspect or the possible implementations of the first aspect.

According to a sixth aspect, this disclosure provides a decoder, including a processor and a transmission interface.

The processor is configured to invoke program instructions stored in a memory, to implement the method according to any one of the second aspect or the possible implementations of the second aspect.

According to a seventh aspect, this disclosure provides a computer-readable storage medium, including a computer program. When the computer program is executed on a computer or a processor, the computer or the processor is enabled to perform the method according to any one of the first and second aspects or the possible implementations of the first and second aspects.

According to an eighth aspect, this disclosure further provides a computer program product. The computer program product includes computer program code. When the computer program code is run on a computer or a processor, the computer or the processor is enabled to perform the method according to any one of the first and second aspects or the possible implementations of the first and second aspects.

DESCRIPTION OF EMBODIMENTS

Figure 1A:
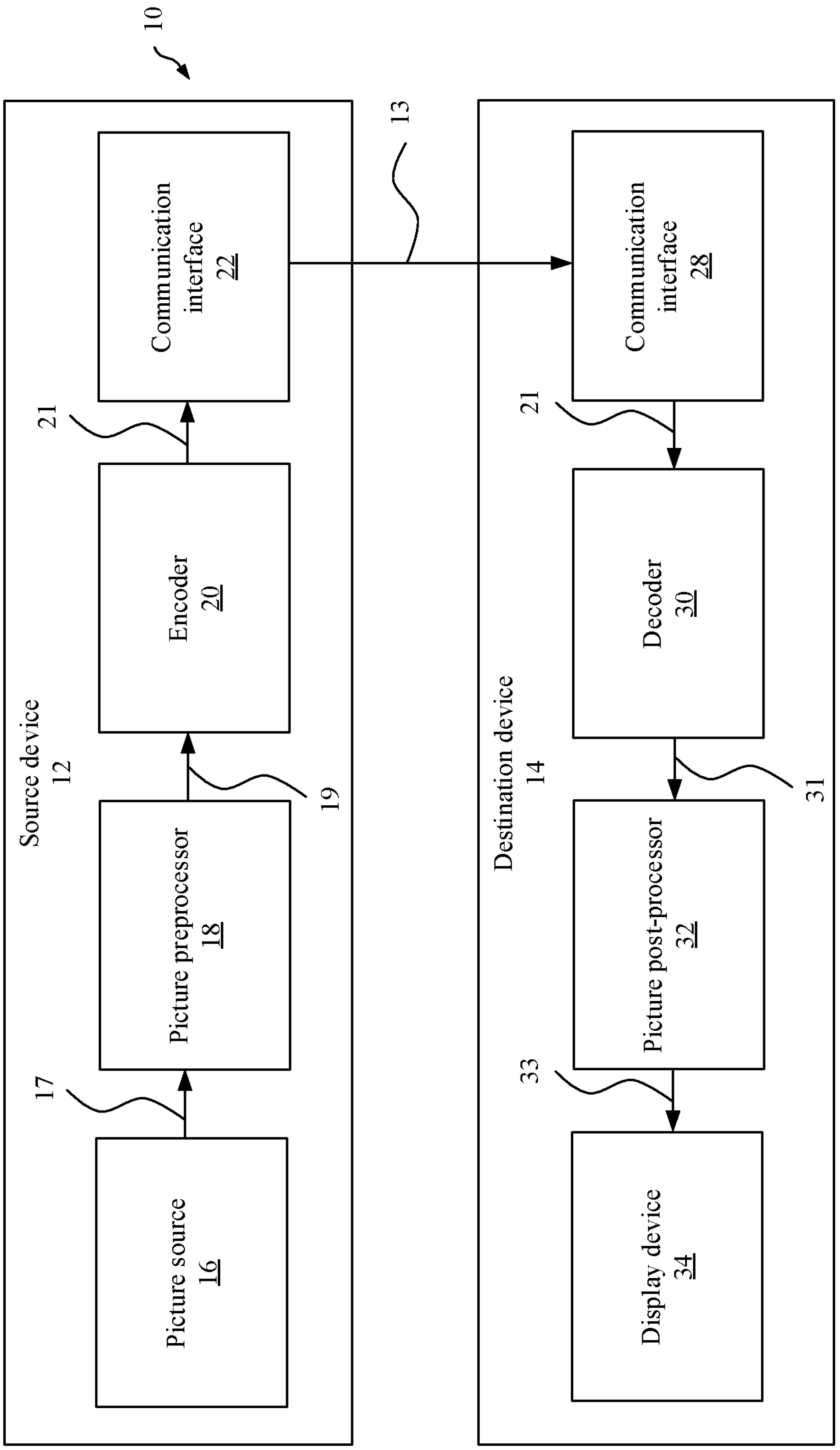
FIG. 1A is a block diagram of an example of a video encoding and decoding system for implementing an embodiment of this disclosure.

To make the objectives, technical solutions, and advantages of this disclosure clearer, the following clearly and completely describes the technical solutions in this disclosure with reference to the accompanying drawings in this disclosure. It is clear that the described embodiments are some rather than all of embodiments of this disclosure. All other embodiments obtained by a person of ordinary skill in the art based on embodiments of this disclosure without creative efforts shall fall within the protection scope of this disclosure.

In the specification, embodiments, claims, and accompanying drawings of this disclosure, terms "first", "second", and the like are merely intended for distinguishing and description, and shall not be understood as an indication or implication of relative importance or an indication or implication of an order. In addition, the terms "include", "comprise", or any other variant thereof are intended to cover a non-exclusive inclusion, for example, a series of steps or units. Methods, systems, products, or devices are not necessarily limited to those steps or units that are literally listed, but may include other steps or units that are not literally listed or that are inherent to such processes, methods, products, or devices.

It should be understood that in this disclosure, “at least one (item)” refers to one or more, and “a plurality of” refers to two or more. The term “and/or” is used for describing an association relationship between associated objects, and represents that three relationships may exist. For example, “A and/or B” may represent the following three cases: only A exists, only B exists, and both A and B exist, where A and B may be singular or plural. The character “/” usually represents an “or” relationship between the associated objects. “At least one of the following items (pieces)” or a similar expression thereof represents any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

The technical solutions in embodiments of this disclosure may not only be applied to an existing video coding standard (for example, an H.264/Advanced Video Coding (AVC) or H.265/High Efficiency Video Coding (HEVC) standard), but also be applied to a future video coding standard (for example, an H.266/Versatile Video Coding (VVC) standard). Terms used in embodiments of this disclosure are only used to explain specific embodiments of this disclosure, but are not intended to limit this disclosure. The following first briefly describes some related concepts in embodiments of this disclosure.

In the field of video coding, the terms “picture”, “frame”, or “image” may be used as synonyms. Video encoding is performed on a source side, and usually includes processing (for example, by compressing) an original video picture to reduce an amount of data for representing the video picture, for more efficient storage and/or transmission. Video decoding is performed on a destination side, and usually includes inverse processing relative to an encoder, to reconstruct video pictures. “Coding” of a video picture in embodiments should be understood as “encoding” or “decoding” of a video sequence. A combination of an encoding part and a decoding part is also referred to as encoding and decoding.

The following describes a system architecture to which an embodiment of this disclosure is applied. FIG. 1A is a block diagram of an example of a video encoding and decoding system 10 for implementing an embodiment of this disclosure. As shown in FIG. 1A, the video encoding and decoding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. Implementations of the source device 12 or the destination device 14 may include one or more processors and a memory coupled to the one or more processors. The memory may include but is not limited to a random-access memory (RAM), a read-only memory (ROM), an electrically erasable programmable ROM (EEPROM), a flash memory, or any other medium that can be used to store required program code in a form of an instruction or a data structure accessible by a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a so-called “smart” phone, a television, a camera, a display apparatus, a digital media player, a video game console, a vehicle-mounted computer, a wireless communication device, or the like.

Although FIG. 1A depicts the source device 12 and the destination device 14 as separate devices, a device embodiment may alternatively include both the source device 12 and the destination device 14 or functionalities of both the source device 12 and the destination device 14, namely, the source device 12 or a corresponding functionality and the destination device 14 or a corresponding functionality. In such embodiments, the source device 12 or the corresponding functionality and the destination device 14 or the corresponding functionality may be implemented by using same hardware and/or software, separate hardware and/or software, or any combination thereof.

A communication connection between the source device 12 and the destination device 14 may be implemented through a link 13, and the destination device 14 may receive encoded video data from the source device 12 through the link 13. The link 13 may include one or more media or apparatuses capable of moving the encoded video data from the source device 12 to the destination device 14. In an example, the link 13 may include one or more communication media that enable the source device 12 to transmit the encoded video data directly to the destination device 14 in real time. In this example, the source device 12 may modulate the encoded video data according to a communication standard (for example, a wireless communication protocol), and may transmit modulated video data to the destination device 14. The one or more communication media may include a wireless communication medium and/or a wired communication medium, for example, a radio frequency (RF) spectrum or one or more physical transmission lines. The one or more communication media may constitute a part of a packet-based network, and the packet-based network is, for example, a local area network, a wide area network, or a global network (for example, the Internet). The one or more communication media may include a router, a switch, a base station, or another device that facilitates communication from the source device 12 to the destination device 14.

The source device 12 includes an encoder 20. Optionally, the source device 12 may further include a picture source 16, a picture preprocessor 18, and a communication interface 22. In a specific implementation form, the encoder 20, the picture source 16, the picture preprocessor 18, and the communication interface 22 may be hardware components in the source device 12, or may be software programs in the source device 12. Descriptions are as follows.

The picture source 16 may include or be any type of picture capture device configured to, for example, capture a real-world picture, and/or any type of device for generating a picture or comment (for screen content encoding, some text on a screen is also considered as a part of a to-be-encoded picture or image), for example, a computer graphics processing unit configured to generate a computer animation picture, or any type of device for obtaining and/or providing a real-world picture or a computer animation picture (for example, screen content or a virtual reality (VR) picture), and/or any combination thereof (for example, an augmented reality (AR) picture). The picture source 16 may be a camera configured to capture a picture or a memory configured to store a picture. The picture source 16 may further include any type of (internal or external) interface through which a previously captured or generated picture is stored and/or a picture is obtained or received. When the picture source 16 is a camera, the picture source 16 may be, for example, a local camera, or an integrated camera integrated into the source device. When the picture source 16 is a memory, the picture source 16 may be a local memory or, for example, an integrated memory integrated into the source device. When the picture source 16 includes an interface, the interface may be, for example, an external interface for receiving a picture from an external video source. The external video source is, for example, an external picture capture device such as a camera, an external memory, or an external picture generation device. The external picture generation device is, for example, an external computer graphics processing unit, a computer, or a server. The interface may be any type of interface, for example, a wired or wireless interface or an optical interface, according to any proprietary or standardized interface protocol.

The picture preprocessor 18 is configured to receive raw picture data 17 and perform preprocessing on the raw picture data 17 to obtain a preprocessed picture 19 or preprocessed picture data 19. For example, the preprocessing performed by the picture preprocessor 18 may include trimming, color format conversion, color correction, or noise reduction. It should be noted that performing preprocessing on the picture data 17 is not a mandatory processing process in this disclosure. This is not limited in this disclosure.

The encoder 20 (or referred to as a video encoder 20) is configured to receive the preprocessed picture data 19, and process the preprocessed picture data 19 by using a related prediction mode (for example, the prediction mode in the embodiments of this specification), to provide encoded picture data 21. In some embodiments, the encoder 20 may be configured to perform each embodiment described below, to implement encoder-side application of the image encoding method described in this disclosure.

The communication interface 22 may be configured to receive the encoded picture data 21, and transmit the encoded picture data 21 to the destination device 14 or any other device (for example, a memory) through the link 13 for storage or direct reconstruction. The any other device may be any device for decoding or storage. The communication interface 22 may be, for example configured to encapsulate the encoded picture data 21 into an appropriate format, for example, a data packet, for transmission through the link 13.

The destination device 14 includes a decoder 30. Optionally, the destination device 14 may further include a communication interface 28, a picture post-processor 32, and a display device 34. Descriptions are as follows.

The communication interface 28 may be configured to receive the encoded picture data 21 from the source device 12 or any other source. The any other source is, for example, a storage device. The storage device is, for example, an encoded picture data storage device. The communication interface 28 may be configured to transmit or receive the encoded picture data 21 through the link 13 between the source device 12 and the destination device 14 or through any type of network. The link 13 is, for example, a direct wired or wireless connection, and the any type of network is, for example, a wired or wireless network or any combination thereof, any type of private or public network, or any combination thereof. The communication interface 28 may be, for example configured to decapsulate the data packet transmitted through the communication interface 22, to obtain the encoded picture data 21.

Both the communication interface 28 and the communication interface 22 may be configured as unidirectional communication interfaces or bidirectional communication interfaces, and may be configured to, for example, send and receive messages to establish a connection, and acknowledge and exchange any other information related to a communication link and/or data transmission such as encoded picture data transmission.

The decoder 30 (or referred to as a decoder 30) is configured to receive the encoded picture data 21, and provide decoded picture data 31 or a decoded picture 31. In some embodiments, the decoder 30 may be configured to perform each embodiment described below, to implement decoder-side application of the image decoding method described in this disclosure.

The picture post-processor 32 is configured to post-process the decoded picture data 31 (also referred to as reconstructed picture data) to obtain post-processed picture data 33. The post-processing performed by the picture post-processor 32 may include color format conversion, color correction, trimming, re-sampling, or any other processing. The picture post-processor 32 may be further configured to transmit post-processed picture data 33 to the display device 34. It should be noted that post-processing the decoded picture data 31 (also referred to as reconstructed picture data) is not a mandatory processing process in this disclosure. This is not further limited in this disclosure.

The display device 34 is configured to receive the post-processed picture data 33 to display a picture, for example, to a user or a viewer. The display device 34 may be or include any type of display configured to present a reconstructed picture, for example, an integrated or external display or monitor. For example, the display may include a liquid-crystal display (LCD), an organic light-emitting diode (LED) (OLED) display, a plasma display, a projector, a micro LED display, a liquid crystal on silicon (LCOS), a digital light processor (DLP), or any type of other display.

Although FIG. 1A depicts the source device 12 and the destination device 14 as separate devices, a device embodiment may alternatively include both the source device 12 and the destination device 14 or functionalities of both the source device 12 and the destination device 14, namely, the source device 12 or a corresponding functionality and the destination device 14 or a corresponding functionality. In such embodiments, the source device 12 or the corresponding functionality and the destination device 14 or the corresponding functionality may be implemented by using same hardware and/or software, separate hardware and/or software, or any combination thereof.

A person skilled in the art clearly knows, based on the description, that existence and (accurate) division of functionalities of different units or the functionalities of the source device 12 and/or the destination device 14 shown in FIG. 1A may vary with an actual device and application. The source device 12 and the destination device 14 may be any one of a wide range of devices, including any type of handheld or stationary device, for example, a notebook or laptop computer, a mobile phone, a smartphone, a pad or a tablet computer, a video camera, a desktop computer, a set-top box, a television set, a camera, a vehicle-mounted device, a display device, a digital media player, a video game console, a video streaming transmission device (such as a content service server or a content distribution server), a broadcast receiver device, or a broadcast transmitter device, and may not use or may use any type of operating system.

The encoder 20 and the decoder 30 each may be implemented as any one of various appropriate circuits, for example, one or more microprocessors, digital signal processors (DSPs), application-specific integrated circuits (ASICs), field-programmable gate arrays (FPGAs), discrete logic, hardware, or any combinations thereof. If the technologies are implemented partially by using software, a device may store software instructions in an appropriate and non-transitory computer-readable storage medium and may execute instructions by using hardware such as one or more processors, to perform the technologies of this disclosure. Any of the foregoing content (including hardware, software, a combination of hardware and software, and the like) may be considered as one or more processors.

In some cases, the video encoding and decoding system 10 shown in FIG. 1A is merely an example and the technologies in this disclosure may be applied to video coding settings (for example, video encoding or video decoding) that do not necessarily include any data communication between an encoding device and a decoding device. In another example, data may be retrieved from a local memory, streamed over a network, or the like. A video encoding device may encode data and store data into the memory, and/or a video decoding device may retrieve and decode data from the memory. In some examples, encoding and decoding are performed by devices that do not communicate with each other but simply encode data to the memory and/or retrieve data from the memory and decode the data.

Figure 1B:
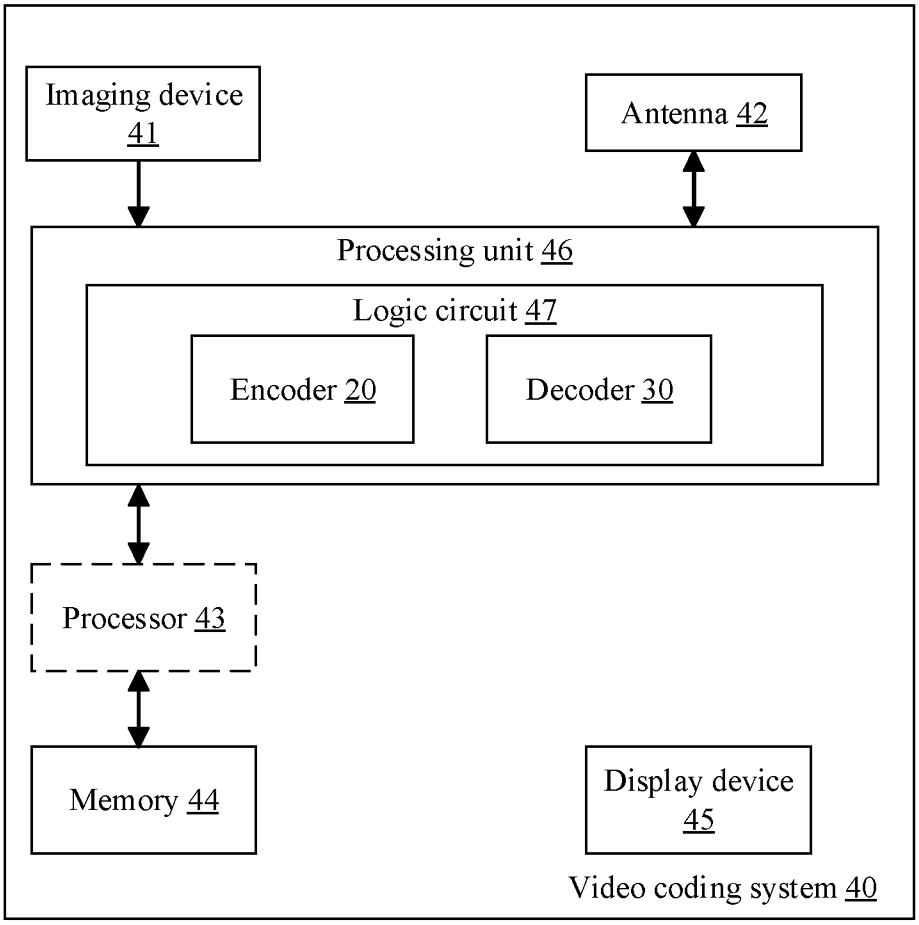
FIG. 1B is a block diagram of an example of a video coding system for implementing an embodiment of this disclosure.

FIG. 1B is a block diagram of an example of a video coding system 40 for implementing an embodiment of this disclosure. The video coding system 40 can implement a combination of various technologies in embodiments of this disclosure. In the illustrated implementation, the video coding system 40 may include an imaging device 41, the encoder 20, the decoder 30 (and/or a video encoder/decoder implemented by using a logic circuit 47 of a processing unit 46), an antenna 42, one or more processors 43, one or more memories 44, and/or a display device 45.

As shown in FIG. 1B, the imaging device 41, the antenna 42, the processing unit 46, the logic circuit 47, the encoder 20, the decoder 30, the processor 43, the memory 44, and/or the display device 45 can communicate with each other. As described, although the video coding system 40 is illustrated with the encoder 20 and the decoder 30, the video coding system 40 may include only the encoder 20 or only the decoder 30 in different examples.

In some examples, the antenna 42 may be configured to transmit or receive an encoded bitstream of video data. Further, in some examples, the display device 45 may be configured to present the video data. In some examples, the processing unit 46 may include ASIC logic, a graphics processing unit, a general-purpose processor, and the like. The video coding system 40 may also include the optional processor 43. The optional processor 43 may similarly include ASIC logic, a graphics processing unit, a general-purpose processor, and the like. In some examples, the processing unit 46 may be implemented by hardware, for example, video coding dedicated hardware, and the processor 43 may be implemented by general-purpose software, an operating system, or the like. In addition, the memory 44 may be any type of memory, for example, a volatile memory (for example, a static RAM (SRAM) or a dynamic RAM (DRAM)), or a non-volatile memory (for example, a flash memory). In a non-limitative example, the memory 44 may be implemented by using a cache memory. In some examples, the logic circuit 47 may access the memory 44 (for example, for implementation of the image buffer). In other examples, the logic circuit 47 and/or the processing unit 46 may include a memory (for example, a cache) for implementation of a picture buffer or the like.

In some examples, the encoder 20 implemented by using the logic circuit may include a picture buffer (for example, implemented by using the processing unit 46 or the memory 44) and a graphics processing unit (for example, implemented by using the processing unit 46). The graphics processing unit may be communicatively coupled to the picture buffer. The graphics processing unit may include the encoder 20 implemented by using the logic circuit 47, to implement various modules of any other encoder system or subsystem described in this specification. The logic circuit may be configured to perform various operations described in this specification.

In some examples, the decoder 30 may be implemented by using the logic circuit 47 in a similar manner, to implement various modules of any other decoder system or subsystem described in this specification. In some examples, the decoder 30 implemented by using the logic circuit may include a picture buffer (implemented by using the processing unit 2820 or the memory 44) and a graphics processing unit (for example, implemented by using the processing unit 46). The graphics processing unit may be communicatively coupled to the picture buffer. The graphics processing unit may include the decoder 30 implemented by using the logic circuit 47, to implement various modules of any other decoder system or subsystem described in this specification.

In some examples, the antenna 42 may be configured to receive an encoded bitstream of video data. As described, the encoded bitstream may include data, an indicator, an index value, mode selection data, or the like related to video frame encoding described in this specification, for example, data related to coding partitioning (for example, a transform coefficient or a quantized transform coefficient, an optional indicator (as described), and/or data defining the coding partitioning). The video coding system 40 may further include the decoder 30 that is coupled to the antenna 42 and that is configured to decode the encoded bitstream. The display device 45 is configured to present a video frame.

It should be understood that, in this embodiment of this disclosure, for the example described with reference to the encoder 20, the decoder 30 may be configured to perform a reverse process. With regard to signaling a syntax element, the decoder 30 may be configured to receive and parse such a syntax element and correspondingly decode related video data. In some examples, the encoder 20 may entropy encode the syntax element into an encoded video bitstream. In such examples, the decoder 30 may parse such a syntax element and correspondingly decode related video data.

It should be noted that the encoder 20 and the decoder 30 in this embodiment of this disclosure may be an encoder/decoder corresponding to a video standard protocol such as H.263, H.264, HEVC, Moving Picture Experts Group (MPEG)-2, MPEG-4, VP8, and VP9 or a next-generation video standard protocol (such as H.266).

The following describes in detail the solutions in embodiments of this disclosure.

Figure 2:
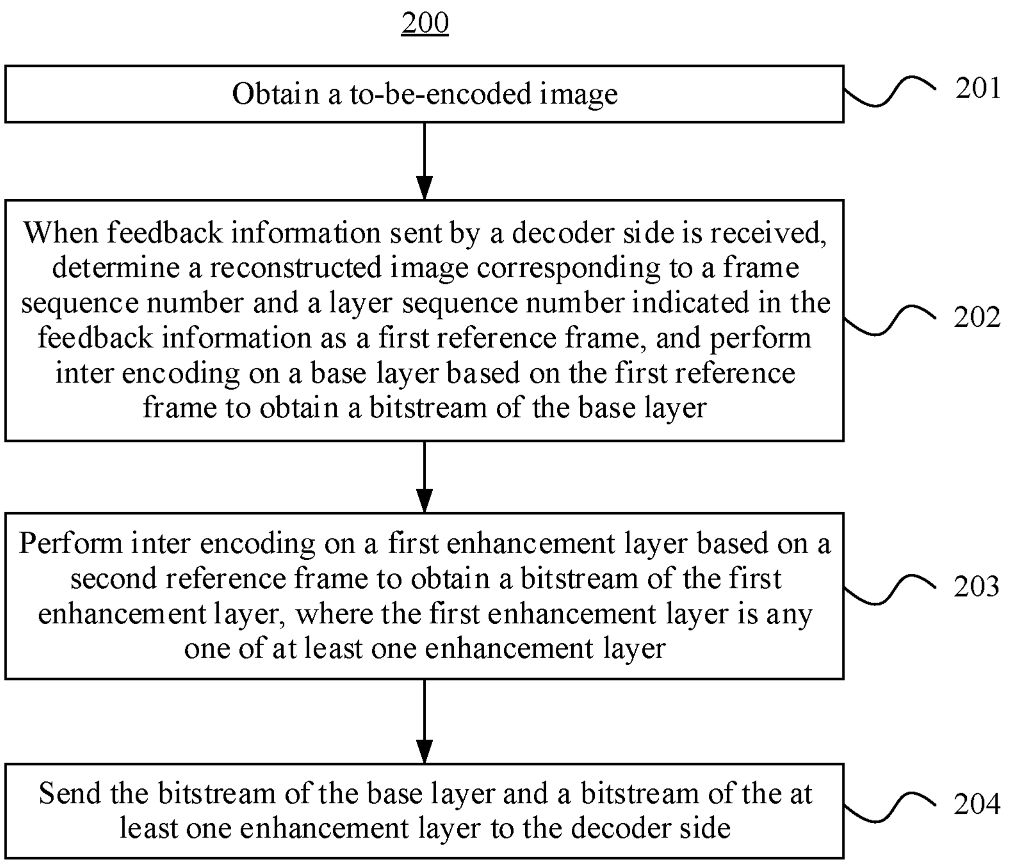
FIG. 2 is a flowchart of an embodiment of an image encoding method according to this disclosure.

FIG. 2 is a flowchart of an embodiment of an image encoding method according to this disclosure. The process 200 may be performed by an encoder of a source device. The process 200 is described as a series of steps or operations. It should be understood that steps or operations of the process 200 may be performed according to various sequences and/or simultaneously, not limited to an execution sequence shown in FIG. 2. As shown in FIG. 2, the method according to this embodiment may include the following steps.

Step 201: Obtain a to-be-encoded image.

The to-be-encoded image is an entire image frame or one sub-image in an entire image frame. For details, refer to the foregoing related descriptions of the image frame. Details are not described herein again. In this disclosure, the to-be-encoded image is divided into a base layer and at least one enhancement layer, and the at least one enhancement layer is arranged in ascending order of quality or resolution.

For image layer division, refer to the SVC protocol. In the SVC protocol, an image frame in a video is divided into one base layer and a plurality of enhancement layers as required. The base layer provides users with most basic image quality and resolution, and a most basic frame rate. The enhancement layer improves the image quality and provides more information such as image resolution, grayscale, and a pixel value. A larger number of image layers indicates higher image quality. When an SVC-encoded bitstream is propagated in a communication network, different MCSs may be used for different image layers. For example, a low-rate MCS is used for a base layer and a low enhancement layer, so that user equipment with a poor channel can obtain a basic video service. A high-rate MCS is used for a high enhancement layer, so that user equipment with a good channel can obtain a video service having higher quality and higher resolution.

Step 202: When feedback information sent by a decoder side is received, determine a reconstructed image corresponding to a frame sequence number and a layer sequence number indicated in the feedback information as a first reference frame, and perform inter encoding on the base layer based on the first reference frame to obtain a bitstream of the base layer.

The feedback information is fed back to an encoder side based on a bitstream receiving status or a bitstream decoding status in a process in which the decoder side receives a bitstream from the encoder side. Based on factors such as a network transmission delay and a processing capability of a decoder, when the encoder side processes a current image (namely a to-be-encoded image), the decoder side may be processing a preceding $n^{th}$ image frame (whose frame sequence number is m-n) of the current image (whose frame sequence number is assumed to be m). If n is 1, it indicates that the decoder side may be processing a previous image frame (whose frame sequence number is m-1) of the current image. If n is 2, it indicates that the decoder side may be processing a preceding $2^{nd}$ image frame (whose frame sequence number is m-2) of the current image, and so on. To enable the encoder side to obtain a latest processing status of the decoder side, the feedback information sent by the decoder side to the encoder side may carry information about the preceding $n^{th}$ image frame, including the frame sequence number (m-n) and a layer sequence number.

In a possible implementation, the encoder side and the decoder side determine, by agreeing or setting in advance, that the layer sequence number carried in the feedback information is subject to successful decoding. In this case, the layer sequence number corresponds to an image layer that has highest quality or resolution and that is successfully decoded by the decoder side from a bitstream of the preceding $n^{th}$ image frame (whose frame sequence number is m-n).

In a possible implementation, the encoder side and the decoder side determine, by agreeing or setting in advance, that the layer sequence number carried in the feedback information is subject to successful reception. In this case, the layer sequence number corresponds to an image layer that has highest quality or resolution and that is successfully received by the decoder side from a bitstream of the preceding $n^{th}$ image frame (whose frame sequence number is m-n).

In a possible implementation, the decoder side may determine, based on a size of the bitstream received, a decoding amount that the decoder side can complete within a predetermined time, and determine, based on a result thereof, an image layer to be decoded. In this case, the layer sequence number corresponds to an image layer that is determined by the decoder side to have highest quality or resolution and that is to be decoded from a bitstream of the preceding $n^{th}$ image frame (whose frame sequence number is m-n). In other words, a to-be-decoded image layer indicates an image layer that can be successfully decoded by the decoder side within the predetermined time and that has not been decoded. In other words, after receiving the bitstream, the decoder side performs determining based on the size of the bitstream and a decoding capability of the decoder side. When determining that the decoder side can successfully decode the bitstream within the predetermined time, the decoder side may send the feedback information to the encoder side without waiting for successful decoding.

In a possible implementation, when the to-be-encoded image is the one sub-image in the entire image frame, the feedback information further includes location information. The location information indicates a location of the to-be-encoded image in the entire image frame. For example, pixels of the entire image frame are 64×64, and the entire image frame is divided into four 32×32 sub-images that are not crossed. Locations of the four sub-images are respectively located in an upper left corner, an upper right corner, a lower left corner, or a lower right corner of the entire image frame. The location information indicates which one of the four sub-images is the to-be-encoded image.

In a possible implementation, when the to-be-encoded image is the one sub-image in the entire image frame, the feedback information further includes information indicating a location of an image layer fed back by the decoder side in the entire image frame, for example, a start location of a slice (when the sub-image is a slice), a sequence number of the sub-image (a size of the sub-image has been agreed in advance), and a width or a height of the sub-image.

In this disclosure, the encoder side may monitor the feedback information within specified duration, and determine that the feedback information is received if the feedback information is received within the specified duration. To be specific, duration may be set on the encoder side, and timing starts after a bitstream of an image frame is sent. If the feedback information is received within the duration, it is considered that the feedback information is received. If the feedback information is not received within the duration, it is considered that the feedback information is not received.

After the encoder side encodes the base layer and the at least one enhancement layer of the to-be-encoded image, the base layer and the at least one enhancement layer are respectively decoded according to a method corresponding to the encoding of each layer to obtain a reconstructed image corresponding to the layer. The reconstructed images are buffered as reference frames of subsequent images.

In an existing solution (for example, the SVC protocol or the SHVC protocol), only a reconstructed image corresponding to a base layer of a preceding $n^{th}$ image frame may be used as a reference for the base layer, and n is a positive integer greater than or equal to 1. It should be understood that the preceding $n^{th}$ image frame indicates an image frame preceding a to-be-encoded image. In the preceding $n^{th}$ image frame, an image layer (for example, any enhancement layer) higher than the base layer corresponds to a reconstructed image having higher quality or resolution than quality or resolution of the reconstructed image corresponding to the base layer. However, the reconstructed image corresponding to the any enhancement layer cannot be used as a reference frame for the base layer. This results in low quality of the bitstream obtained by encoding the base layer, low quality or resolution of a reconstructed image obtained based on this, and even low quality or resolution of a reconstructed image obtained by the decoder side through decoding based on this. In this disclosure, an encoder side obtains, based on the feedback information from the decoder side, an image layer of an image frame that has highest quality or resolution and that can be obtained by the decoder side. The encoder side uses a reconstructed image corresponding to the image layer as a reference frame for the base layer. In other words, when the encoder side encodes the base layer, inter encoding is performed by referring to a reconstructed image corresponding to an image layer that has highest quality or resolution in the preceding $n^{th}$ image frame and that is successfully decoded, successfully received, or to be decoded by the decoder side. Feedback from the decoder side usually also reflects a network transmission status, in other words, an image layer whose transmission requirement and bit rate are met by a current network status. Therefore, an encoding layer uses the reconstructed image corresponding to the image layer as a reference frame to perform inter encoding on the base layer, providing a good reference for a related region (for example, a static region) of the to-be-encoded image. This can improve quality of a bitstream obtained by encoding the base layer, improve quality or resolution of a reconstructed image obtained based on the bitstream, and even improve quality or resolution of a reconstructed image obtained by the decoder side by decoding the bitstream of the base layer, thereby improving quality or resolution of the current image frame.

Step 203: Perform inter encoding on a first enhancement layer based on a second reference frame to obtain a bitstream of the first enhancement layer, where the first enhancement layer is any one of the at least one enhancement layer.

The first enhancement layer is any one of the at least one enhancement layer, and a first image layer is one of the base layer and the at least one enhancement layer. The first image layer has lower quality or resolution than quality or resolution of the first enhancement layer. In a to-be-encoded image frame, a higher image layer may be encoded by referring to a reconstructed image corresponding to an image layer lower than the higher image layer. For example, the to-be-encoded image has one base layer and three enhancement layers. A layer sequence number of the base layer is 0, and layer sequence numbers of the enhancement layers are 1, 2, and 3 in ascending order of quality or resolution. A reference frame for encoding the enhancement layer 1 is a reconstructed image corresponding to the base layer 0, a reference frame for encoding the enhancement layer 2 is a reconstructed image corresponding to the enhancement layer 1 or the reconstructed image corresponding to the base layer 0, and a reference frame for encoding the enhancement layer 3 is a reconstructed image corresponding to the enhancement layer 2 or the reconstructed image corresponding to the enhancement layer 1 or the reconstructed image corresponding to the base layer 0. As long as a condition in which a higher image layer may be encoded by referring to a reconstructed image corresponding to an image layer lower than the higher image layer is met, this disclosure does not limit the reconstructed image corresponding to the image layer of the same image frame that is further used as a reference for the enhancement layer.

In an existing solution (for example, the SVC protocol or the SHVC protocol), a reconstructed image corresponding to a same image layer of a preceding $n^{th}$ image frame and a reconstructed image corresponding to a lower image layer of the same image frame are simultaneously used as references for an enhancement layer. In other words, for any enhancement layer, a reconstructed image corresponding to a same image layer of a preceding $n^{th}$ image frame needs to be used as a reference to provide a good reference for a related region (for example, a static region) to be encoded, and a reconstructed image corresponding to a lower image layer of the same image frame needs to be used as a reference to provide a good reference for a cover region to be encoded. However, a related processing process of the two reference frames increases a calculation amount. In addition, when a reference frame for an enhancement layer can only be a reconstructed image corresponding to a same image layer of a preceding $n^{th}$ image frame and a reconstructed image corresponding to a lower image layer of the same image frame, quality or resolution of the enhancement layer is limited. In this disclosure, a base layer is used as a reference for any enhancement layer. As described above, the base layer is encoded by referring to an image layer that has highest quality or resolution in a preceding $n^{th}$ image frame and that is successfully decoded, successfully received, or to be decoded by the decoder side. This has improved quality or resolution of the base layer, further improves quality of a bitstream obtained by encoding the enhancement layer by referring to the base layer, and may further improve quality or resolution of a reconstructed image obtained based on the bitstream, and even quality or resolution of a reconstructed image obtained by the decoder side by decoding the bitstream of the base layer. If an enhancement layer is used as a reference, and a base layer is also directly or indirectly used as a reference for the enhancement layer, quality of a bitstream obtained by encoding the enhancement layer may be improved, quality or resolution of a reconstructed image obtained based on the bitstream may also be improved, and even quality or resolution of a reconstructed image obtained by the decoder side by decoding the bitstream of the base layer may be improved. Therefore, when a good reference is provided for a related region (for example, a static region) to be encoded during encoding the base layer, a low image layer is used as a reference frame for a high image layer of a same image frame. This may further provide a reference for a cover region, and finally improve quality or resolution of the high image layer.

Step 204: Send the bitstream of the base layer and the bitstream of the at least one enhancement layer to the decoder side.

The bitstream of the base layer carries coding reference information, and the coding reference information includes a frame sequence number and a layer sequence number of the first reference frame. The encoder side may pack and send the bitstream of the base layer and the bitstream of the at least one enhancement layer to the decoder side. Alternatively, the encoder side may separately pack and sequentially send the bitstream of the base layer and the bitstream of the at least one enhancement layer by image layer to the decoder side. This is not limited in this disclosure. The encoder side sends a frame sequence number and a layer sequence number of a reference frame used for encoding the base layer to the decoder side. When performing inter decoding, the decoder side may directly obtain a reconstructed image at a corresponding image layer as a reference image.

After sending the bitstream, the encoder side starts a timer, and monitors feedback information from the decoder side within specified duration, to determine a reference frame for a base layer of a subsequent image frame during encoding.

In an existing solution (for example, the SVC protocol or the SHVC protocol), feedback is not required for each image frame or sub-image frame. Therefore, an image error or error transmission may occur, and periodic correction needs to be performed by periodically inserting an intra encoding frame. In this disclosure, feedback may be performed for each image frame or sub-image frame. This avoids error transmission and improves image quality. This further avoids periodically inserting an intra encoding frame and lowering a bit rate.

It can be learned that, in the image encoding method provided in this disclosure, the encoder side obtains, based on the feedback information from the decoder side, an image layer of an image frame that has highest quality or resolution and that can be obtained by the decoder side. The image layer best meets a network transmission status and a bit rate requirement. This can improve quality or resolution of a base layer. An enhancement layer of a same image frame is encoded by referring to a reconstructed image of a lower layer. This can improve quality or resolution of a current image frame.

In a possible implementation, when the feedback information is not received or the feedback information includes identification information indicating a receiving failure or a decoding failure, inter encoding is performed on the base layer based on a third reference frame. The third reference frame is a reference frame for a base layer of a previous image frame of the to-be-encoded image. Before step 202, if the encoder side has not received the feedback information from the decoder side within the specified duration when monitoring the feedback information, the base layer of the current image frame may be encoded by referring to the reference frame for the base layer of the previous image frame. Because a change between adjacent image frames in a video is very small, even if latest feedback information cannot be received due to a network factor, the previous image frame may be used as a reference, and quality or resolution of the current image frame is not greatly affected.

In a possible implementation, when the feedback information is not received or the feedback information includes identification information indicating a receiving failure or a decoding failure, intra encoding is performed on the base layer. Similarly, before step 202, if the encoder side has not received the feedback information from the decoder side within the specified duration when monitoring the feedback information, the base layer of the current image frame may alternatively be encoded according to an intra encoding scheme. In this way, the intra encoding scheme does not affect quality or resolution of the base layer, thereby ensuring the quality or resolution of the current image frame.

Figure 3:
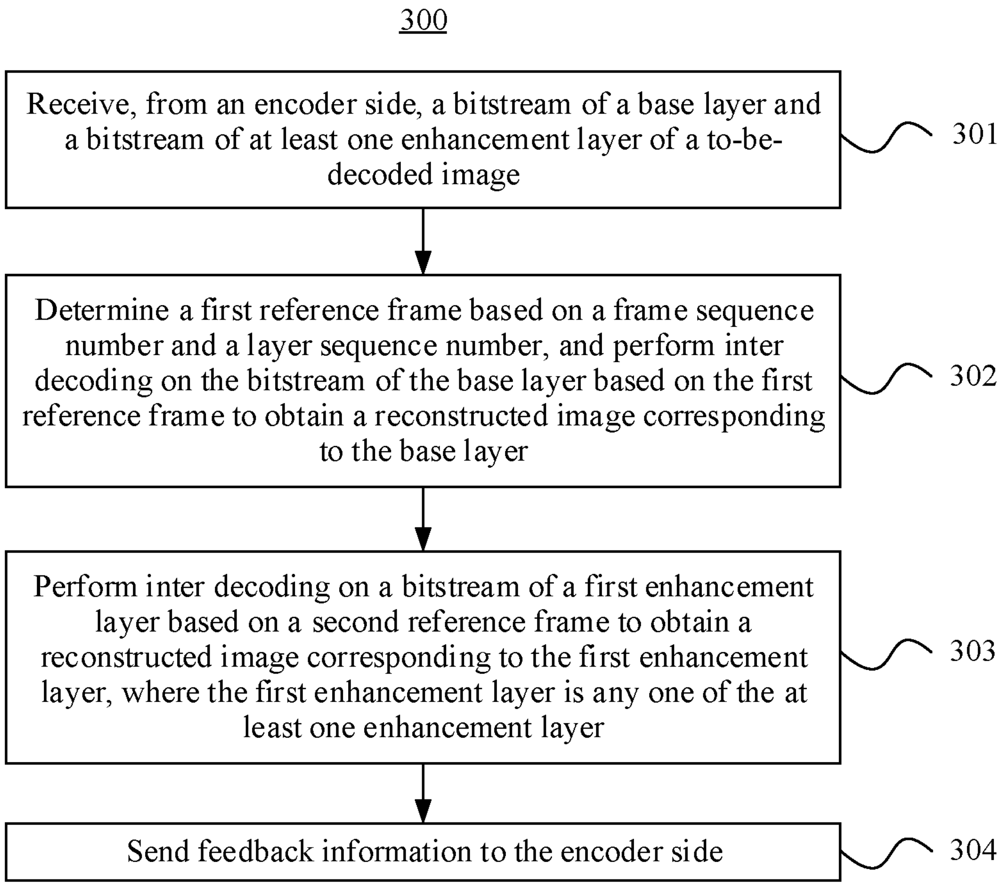
FIG. 3 is a flowchart of an embodiment of an image decoding method according to this disclosure.

FIG. 3 is a flowchart of an embodiment of an image decoding method according to this disclosure. The process 300 may be performed by a decoder of a destination device. The process 300 is described as a series of steps or operations. It should be understood that steps or operations of the process 300 may be performed according to various sequences and/or simultaneously, not limited to an execution sequence shown in FIG. 3. As shown in FIG. 3, the method according to this embodiment may include the following steps.

Step 301: Receive, from an encoder side, a bitstream of a base layer and a bitstream of at least one enhancement layer of a to-be-decoded image.

Corresponding to step 204 in the foregoing method embodiment, a decoder side receives the bitstream of the base layer of the to-be-decoded image from the encoder side, or the bitstreams of the base layer and the at least one enhancement layer. The bitstream of the base layer carries coding reference information. The coding reference information includes a frame sequence number and a layer sequence number of a reference frame used when the encoder side encodes a base layer of an image (corresponding to the to-be-decoded image). The to-be-decoded image may be an entire image frame, or may be one sub-image in an entire image frame. Optionally, when the to-be-decoded image is the one sub-image in the entire image frame, the coding reference information further includes location information. The location information indicates a location of a reference frame that is used when the encoder side encodes the base layer of the image (corresponding to the to-be-decoded image) and that in the entire image frame.

Step 302: Determine a first reference frame based on the frame sequence number and the layer sequence number, and perform inter decoding on the bitstream of the base layer based on the first reference frame to obtain a reconstructed image corresponding to the base layer.

The decoder side may directly obtain the reference frame for the base layer based on the information carried in the bitstream, and perform inter decoding on the base layer based on the reference frame.

Step 303: Perform inter decoding on a bitstream of a first enhancement layer based on a second reference frame to obtain a reconstructed image corresponding to the first enhancement layer, where the first enhancement layer is any one of the at least one enhancement layer.

The first enhancement layer is any one of the at least one enhancement layer, and the second reference frame is a reconstructed image corresponding to a first image layer. The first image layer is one of the base layer and the at least one enhancement layer. The first image layer has lower quality or resolution than quality or resolution of the first enhancement layer. In this disclosure, a decoder corresponding to an encoder is used to decode from a base layer by layer. A reconstructed image corresponding to a lower layer may be used as a reference frame for a higher image layer. It should be noted that the reference frame for the higher image layer may be a reconstructed image corresponding to a layer one layer lower, may be a reconstructed image corresponding to the base layer, or may be a reconstructed image corresponding to a layer a few layers lower. This is not limited in this disclosure.

In a possible implementation, when the bitstream of the base layer and/or the bitstream of the at least one enhancement layer include/includes coding scheme indication information, the decoder side may decode a corresponding image layer according to a scheme indicated in the coding scheme indication information. The scheme indicated in the coding scheme indication information includes intra decoding or inter decoding. Corresponding to the encoder side, if the encoder side encodes an image layer through intra encoding, the decoder side needs to decode the image layer through intra decoding. If the encoder side encodes an image layer through inter encoding based on a reference frame, the decoder side needs to decode the image layer through inter decoding based on the reference frame.

In this disclosure, the decoder side may obtain the to-be-decoded image based on the reconstructed image corresponding to the base layer and a reconstructed image corresponding to the at least one enhancement layer.

Step 304: Send feedback information to the encoder side.

The feedback information includes a second frame sequence number and a second layer sequence number. The second frame sequence number corresponds to the to-be-decoded image. The second layer sequence number corresponds to an image layer having highest quality or resolution in the base layer and the at least one enhancement layer of the to-be-decoded image. In a process of processing the to-be-decoded image, the decoder side may send feedback information related to the to-be-decoded image to the encoder side. As described in the foregoing embodiment, the feedback information is used by the encoder side to determine a reference frame for encoding a base layer of a subsequent image frame.

The frame sequence number in the feedback information corresponds to a frame sequence number of the to-be-decoded image. The layer sequence number corresponds to an image layer that has highest quality or resolution and that is successfully decoded from the bitstream of the base layer and the bitstream of the at least one enhancement layer of the to-be-decoded image. Alternatively, the layer sequence number corresponds to an image layer that has highest quality or resolution and that is successfully received from the bitstream of the base layer and the bitstream of the at least one enhancement layer of the to-be-decoded image. Alternatively, the layer sequence number corresponds to an image layer that is currently determined to have highest quality or resolution and that is to be decoded from the bitstream of the base layer and the bitstream of the at least one enhancement layer of the to-be-decoded image. Similar to step 202, the layer sequence number corresponds to an image layer that is successfully decoded, successfully received, or to be decoded, and relates to a scheme agreed or set in advance between the encoder side and the decoder side, or relates to a processing capability of the decoder side. Details are not described herein again.

In a possible implementation, when both the bitstream of the base layer and the bitstream of the at least one enhancement layer fail to be received, the decoder side may include identification information indicating a receiving failure in the feedback information. Alternatively, when the bitstream of the base layer and/or the bitstream of the at least one enhancement layer fail/fails to be decoded, the decoder side may include identification information indicating a decoding failure in the feedback information.

In a possible implementation, when the feedback information includes frame sequence numbers and layer sequence numbers of all image layers that are successfully decoded, to be decoded, or successfully received, the decoder side may buffer reconstructed images corresponding to all the image layers of the to-be-decoded image. Alternatively, when the feedback information includes a frame sequence number and a layer sequence number of an image layer that has highest quality or resolution and that is successfully decoded, to be decoded, or successfully received, the decoder side may only buffer a reconstructed image corresponding to the image layer that has highest quality or resolution in the to-be-decoded image and that is successfully decoded, to be decoded, or successfully received.

Based on the technical solutions of the foregoing method embodiments, the following uses specific embodiments for detailed description.

Figure 4:
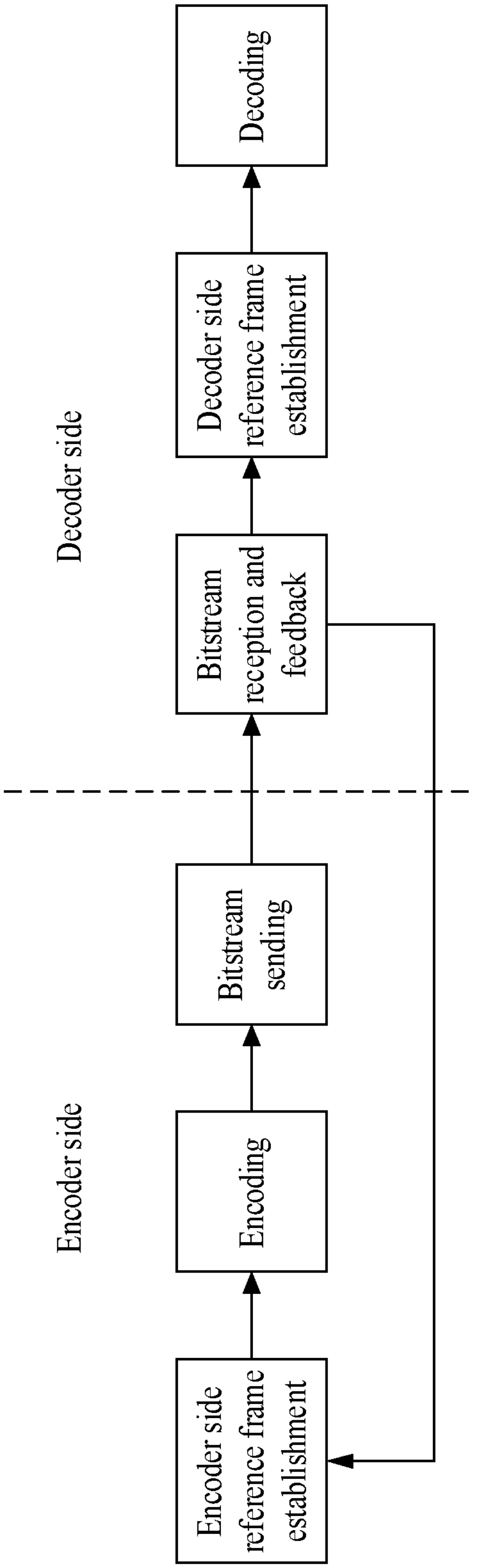
FIG. 4 is an example schematic diagram of an image encoding and decoding process.

FIG. 4 is an example schematic diagram of an image encoding and decoding process. As shown in FIG. 4, an encoder side includes encoder side reference frame establishment, encoding, and bitstream sending. A decoder side includes bitstream reception and feedback, decoder side reference frame establishment, and decoding. The image encoding method and the image decoding method provided in this disclosure mainly relate to encoder/decoder side reference frame establishment, encoding and decoding, and feedback.

Figure 5:
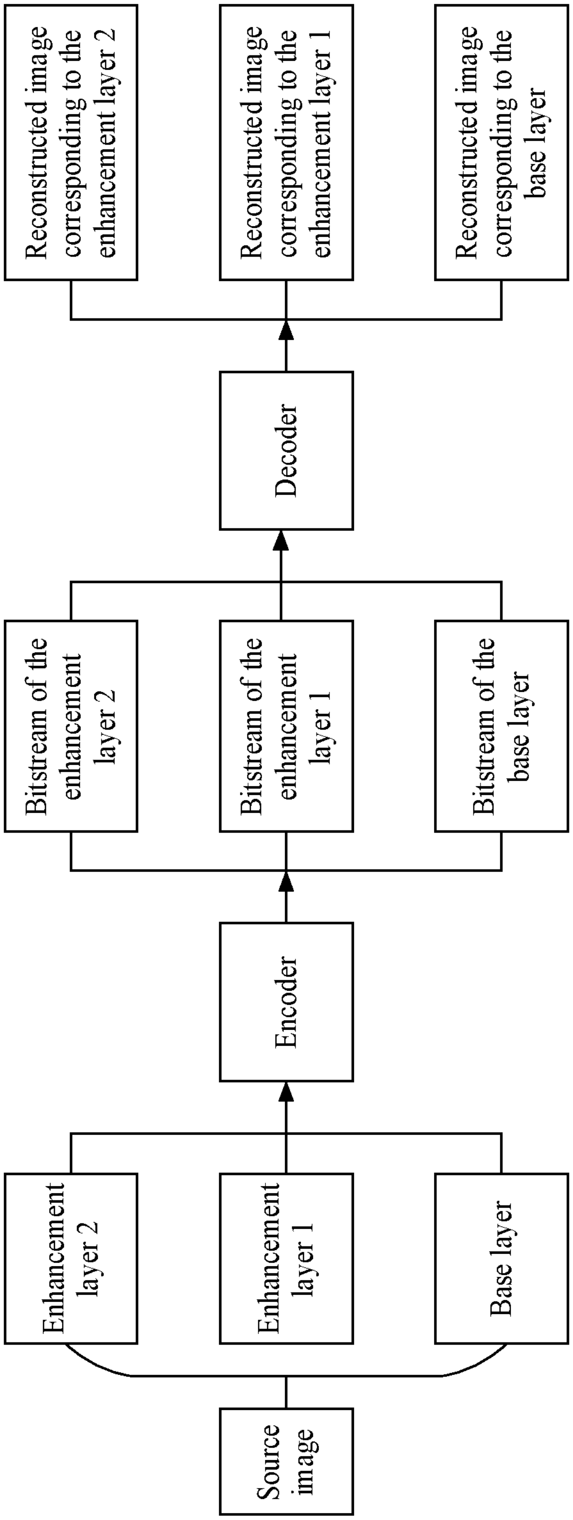
FIG. 5 is an example schematic diagram of layered image encoding and decoding.

FIG. 5 is an example schematic diagram of layered image encoding and decoding. As shown in FIG. 5, a source image is divided into a base layer and at least one enhancement layer (for example, an enhancement layer 1 and an enhancement layer 2). These image layers generate a plurality of bitstreams (including a bitstream of the base layer, a bitstream of the enhancement layer 1, and a bitstream of the enhancement layer 2) after encoding. These bitstreams are transmitted to a decoder side through a network. The decoder side decodes the bitstream of the base layer, the bitstream of the enhancement layer 1, and the bitstream of the enhancement layer 2 layer by layer to obtain a reconstructed image corresponding to the base layer, a reconstructed image corresponding to the enhancement layer 1, and a reconstructed image corresponding to the enhancement layer 2. The decoder side may obtain reconstructed images having different resolution or quality by decoding some or all of the foregoing bitstreams. More decoded bitstreams indicate higher resolution or quality of the reconstructed image obtained.

Figure 6:
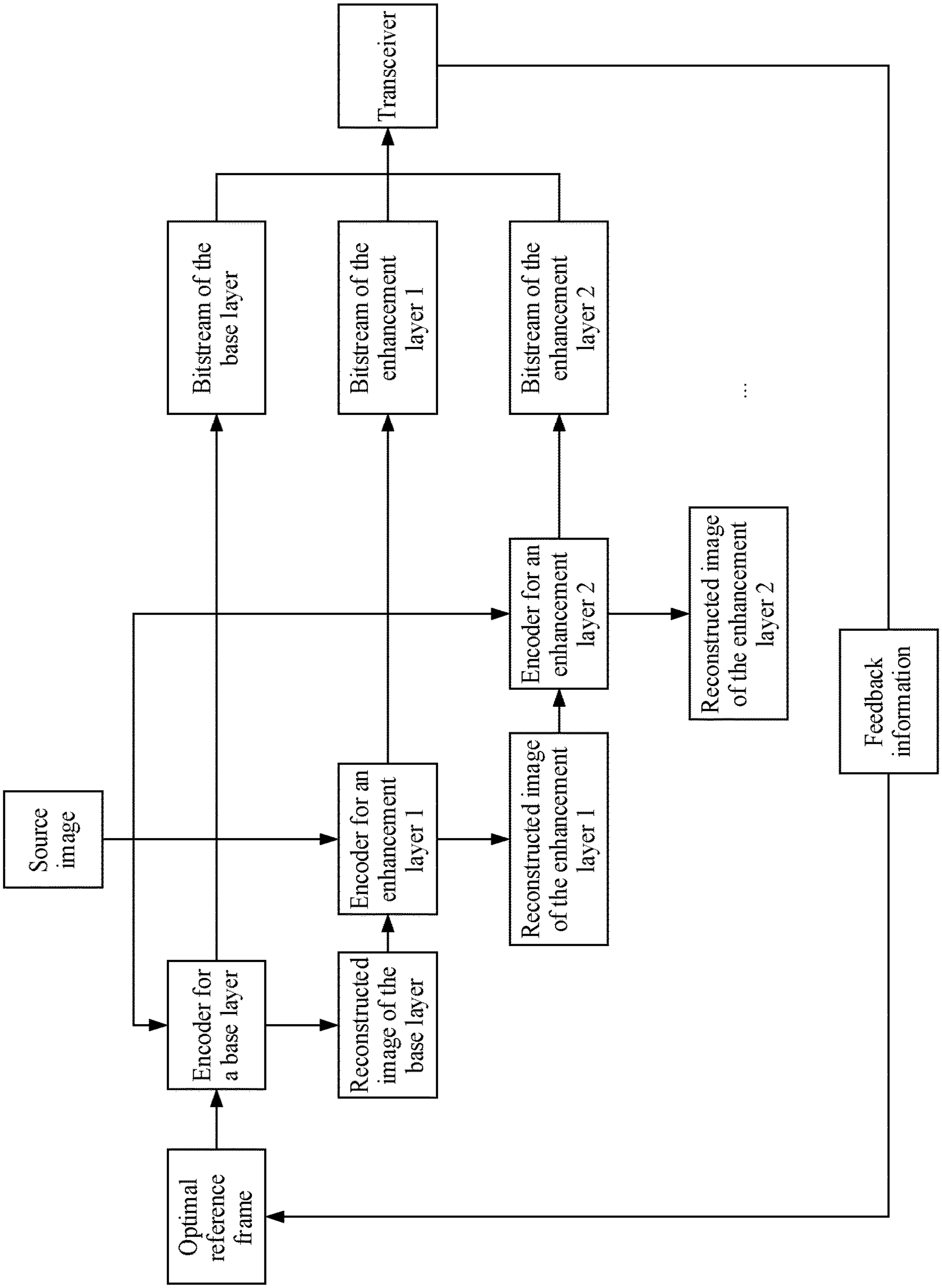
FIG. 6 is an example schematic diagram of an encoding process on an encoder side.

FIG. 6 is an example schematic diagram of an encoding process on an encoder side. As shown in FIG. 6, a base layer of a source image is encoded by an encoder for the base layer to obtain a bitstream of the base layer. A reference frame for inter encoding the base layer is an optimal reference frame. Determination of the optimal reference frame is related to feedback information received by a transceiver from a decoder side. The encoder for the base layer may further deconstruct a reconstructed image of the base layer. An enhancement layer 1 of the source image is encoded by an encoder for the enhancement layer 1 to obtain a bitstream of the enhancement layer 1. A reference frame for inter encoding the enhancement layer 1 is the reconstructed image of the base layer. The encoder for the enhancement layer 1 may further deconstruct a reconstructed image of the enhancement layer 1. An enhancement layer 2 of the source image is encoded by an encoder for the enhancement layer 2 to obtain a bitstream of the enhancement layer 2. A reference frame for inter encoding the enhancement layer 2 is the reconstructed image of the enhancement layer 1. The encoder for the enhancement layer 2 may further deconstruct a reconstructed image of the enhancement layer 2. The rest can be deduced by analogy. The bitstream of the base layer, the bitstream of the enhancement layer 1, and the bitstream of the enhancement layer 2 are sent by the transceiver.

Figure 7:
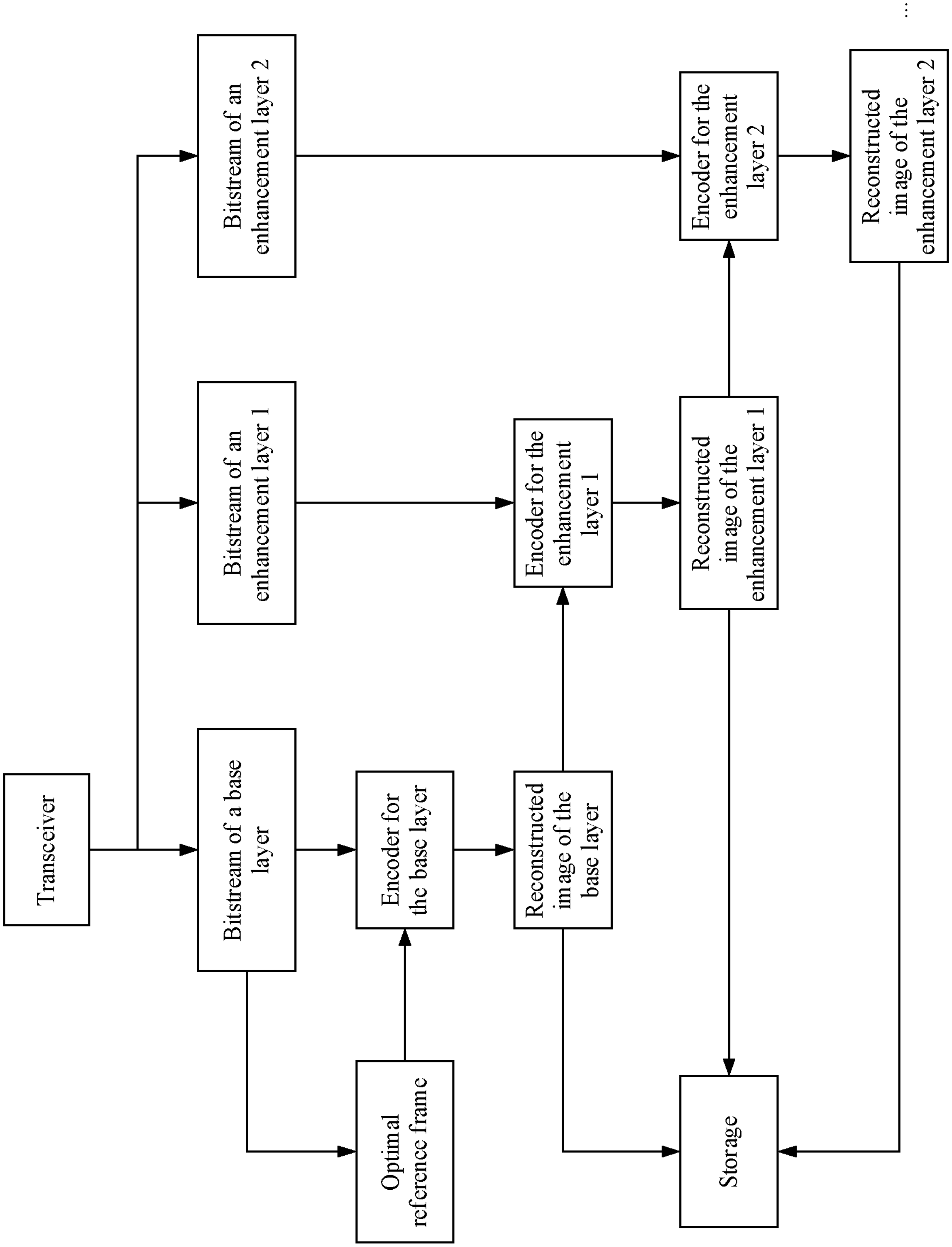
FIG. 7 is an example schematic diagram of a decoding process on a decoder side.

FIG. 7 is an example schematic diagram of a decoding process on a decoder side. As shown in FIG. 7, a transceiver on the decoder side receives a bitstream of a base layer, a bitstream of an enhancement layer 1, and a bitstream of an enhancement layer 2 from an encoder side. A decoder for the base layer performs inter decoding on the bitstream of the base layer to obtain a reconstructed image of the base layer. A reference frame for the base layer is determined based on information carried in the bitstream of the base layer. A decoder for the enhancement layer 1 performs inter decoding on the bitstream of the enhancement layer 1 to obtain a reconstructed image of the enhancement layer 1. A reference frame for the enhancement layer 1 is the reconstructed image of the base layer. A decoder for the enhancement layer 2 performs inter decoding on the bitstream of the enhancement layer 2 to obtain a reconstructed image of the enhancement layer 2. A reference frame for the enhancement layer 2 is the reconstructed image of the enhancement layer 1. The rest can be deduced by analogy. The decoder side may store the reconstructed image of the base layer, the reconstructed image of the enhancement layer 1, and the reconstructed image of the enhancement layer 2.

Figure 8A:
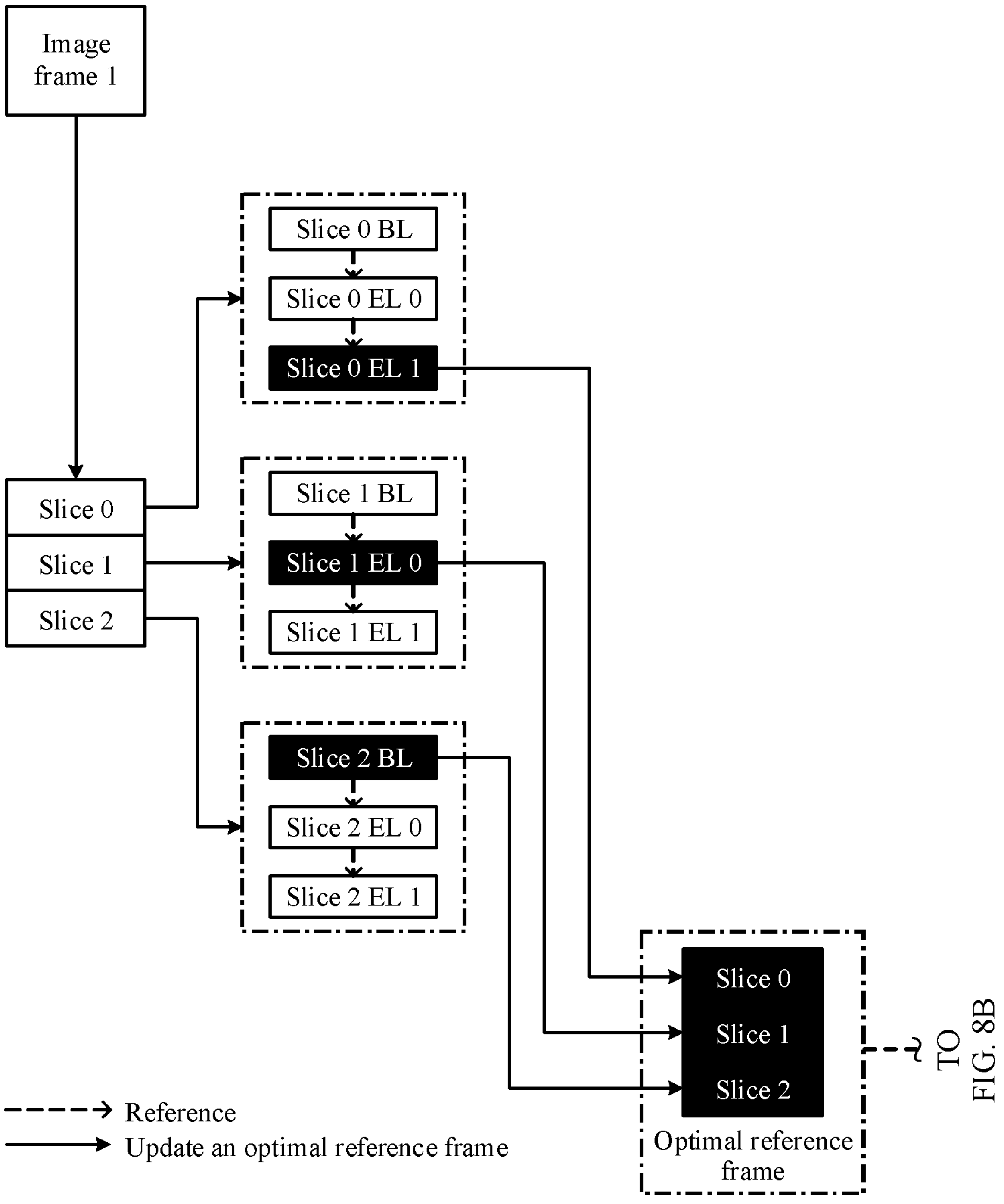
FIG. 8A, FIG. 8B, and FIG. 8C are an example schematic diagram of an image encoding method according to this disclosure.
Figure 8B:
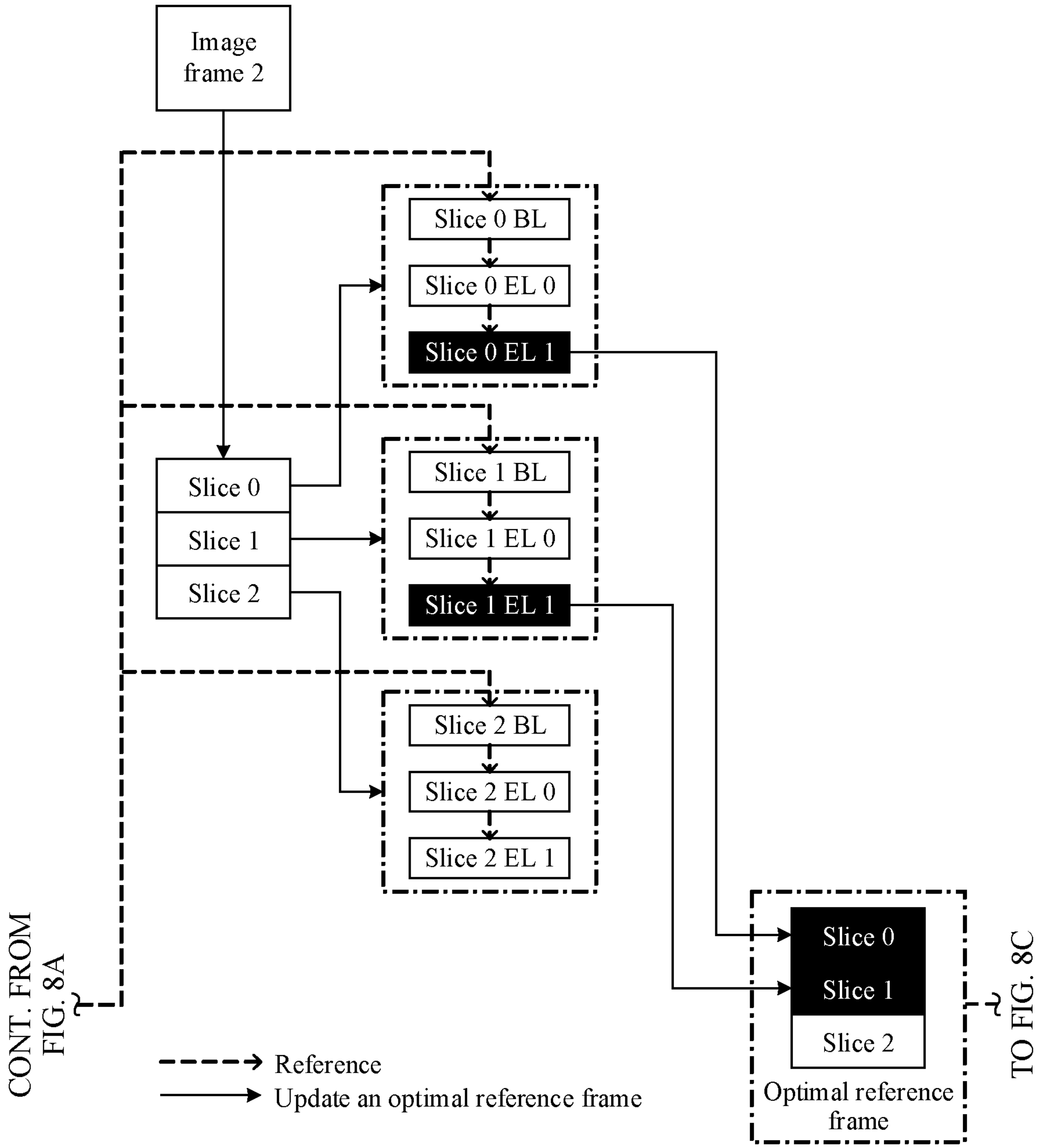
Figure 8C:
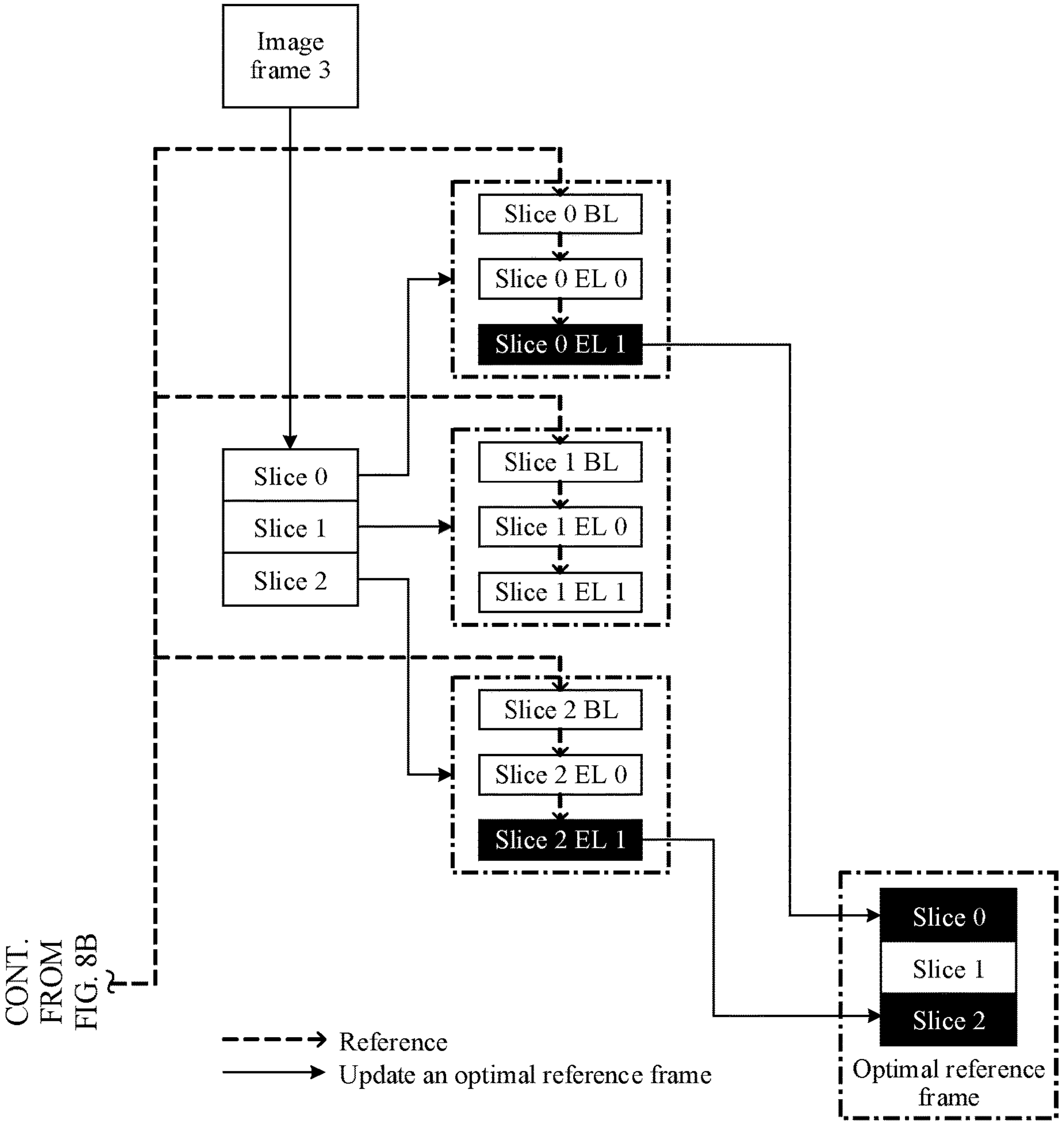

FIG. 8A to FIG. 8C are an example schematic diagram of an image encoding method according to this disclosure. As shown in FIG. 8A to FIG. 8C, an image frame is divided into three sub-images (a slice 0, a slice 1, and a slice 2), and each sub-image is divided into a base layer (BL) and a plurality of enhancement layers (an EL 0, an EL 1, . . . ) for encoding.

In an encoding/decoding process, an optimal reference frame for the base layer is updated by slice based on an update signal. On an encoder side, the update signal is a new feedback signal, namely an image layer that has highest quality or resolution and that is successfully decoded, successfully received, or to be decoded on a decoder side. On the decoder side, the update signal is coding reference information carried in a bitstream of the base layer, namely an image layer of an image frame used by the encoder during encoding. If none of the image layers of the image frame is received or successfully decoded by the decoder side, the optimal reference frame for the image frame is not updated.

Encoder Side:

1. After an image frame 1 is encoded, reconstructed images corresponding to all image layers of all sub-images of the image frame 1 are buffered, namely slice 0 BL, slice 0 EL 0, slice 0 EL 1, . . . , slice 1 BL, slice 1 EL 0, slice 1 EL 1, . . . , slice 2 BL, slice 2 EL 0, and slice 2 EL 1.
2. A bitstream of each image layer of each sub-image of the image frame 1 is transmitted, and a feedback signal of the decoder side is obtained. The feedback signal includes a layer sequence number of an image layer that has highest quality or resolution and that is successfully decoded, successfully received, or to be decoded by the decoder side.
3. A reconstructed image indicated by the layer sequence number corresponding to each slice is updated to an optimal reference frame for the corresponding slice, namely black image layers corresponding to the image frame 1 in FIG. 8A: slice 0 EL 1, slice 1 EL 0, and slice 2 BL.
4. Each updated optimal reference frame is used as a reference frame for a base layer of each sub-image of an image frame 2, and is used for inter encoding on the base layer of each sub-image of the image frame 2.
5. After the image frame 2 is encoded, reconstructed images corresponding to all image layers of all sub-images of the image frame 2 are buffered, namely slice 0 BL, slice 0 EL 0, slice 0 EL 1, . . . , slice 1 BL, slice 1 EL 0, slice 1 EL 1, . . . , slice 2 BL, slice 2 EL 0, and slice 2 EL 1.
6. A bitstream of each image layer of each sub-image of the image frame 2 is transmitted, and a feedback signal of the decoder side is obtained. The feedback signal includes a layer sequence number of an image layer that has highest quality or resolution and that is successfully decoded, successfully received, or to be decoded by the decoder side.
7. A reconstructed image indicated by the layer sequence number corresponding to each slice is updated to an optimal reference frame for the corresponding slice, namely black image layers corresponding to the image frame 2 in FIG. 8B: slice 0 EL 1 and slice 1 EL 1. An optimal reference frame is not updated due to transmission loss of all layers of the slice 2. A reference frame for the base layer of the slice 2 is still the reference frame slice 2 BL for the base layer of the slice 2 of the image frame 1.
8. Each updated optimal reference frame is used as a reference frame for a base layer of each sub-image of an image frame 3, and is used for inter encoding on the base layer of each sub-image of the image frame 3.
9. After the image frame 3 is encoded, reconstructed images corresponding to all image layers of all sub-images of the image frame 3 are buffered, namely slice 0 BL, slice 0 EL 0, slice 0 EL 1, . . . , slice 1 BL, slice 1 EL 0, slice 1 EL 1, . . . , slice 2 BL, slice 2 EL 0, and slice 2 EL 1.
10. A bitstream of each image layer of each sub-image of the image frame 3 is transmitted, and a feedback signal of the decoder side is obtained. The feedback signal includes a layer sequence number of an image layer that has highest quality or resolution and that is successfully decoded, successfully received, or to be decoded by the decoder side.
11. A reconstructed image indicated by the layer sequence number corresponding to each slice is updated to an optimal reference frame for the corresponding slice, namely black image layers corresponding to the image frame 3 in FIG. 8C: slice 0 EL 1 and slice 2 EL 1. An optimal reference frame is not updated due to transmission loss of all layers of the slice 1. A reference frame for the base layer of the slice 1 is still the reference frame slice 1 EL 1 for the base layer of the slice 1 of the image frame 2.
12. Each updated optimal reference frame is used as a reference frame for a base layer of each corresponding sub-image of an image frame 4, and is used for inter encoding on the base layer of each sub-image of the image frame 4.

The rest can be deduced by analogy.

Decoder Side:

1. Bitstreams of an image frame 1 are received and decoded.
2. After the image frame 1 is decoded, Case 1: A feedback signal is sent for each layer of the image frame 1. In other words, a feedback signal is sent each time a bitstream of an image layer is received successfully, or a feedback signal is sent each time a bitstream of an image layer is decoded successfully. Reconstructed images corresponding to all image layers of all sub-images of the image frame 1 are buffered, namely slice 0 BL, slice 0 EL 0, slice 0 EL 1, . . . , slice 1 BL, slice 1 EL 0, slice 1 EL 1, . . . , slice 2 BL, slice 2 EL 0, and slice 2 EL 1. Case 2: If only one feedback signal is sent for the image frame 1, only reconstructed images slice 0 EL 1, slice 1 EL 0 and slice 2 BL respectively corresponding to image layers having highest quality or resolution in the image frame 1 are stored.
3. A reference frame for a base layer of each slice of the image frame 1 is updated to a corresponding optimal reference frame based on coding reference information in a bitstream of a base layer of the image frame 1, for example, slice 0 EL 1, slice 1 EL 0, and slice 2 BL.
4. Each updated optimal reference frame is used as a reference frame for a base layer of a corresponding sub-image of an image frame 2, and is used for inter decoding on the base layer of the image frame 2.
5. Bitstreams of the image frame 2 are received and decoded.
6. After the image frame 2 is decoded, Case 1: A feedback signal is sent for each layer of the image frame 2. In other words, a feedback signal is sent each time a bitstream of an image layer is received successfully, or a feedback signal is sent each time a bitstream of an image layer is decoded successfully. Reconstructed images corresponding to all image layers of all sub-images of the image frame 2 are buffered, namely slice 0 BL, slice 0 EL 0, slice 0 EL 1, . . . , slice 1 BL, slice 1 EL 0, slice 1 EL 1, . . . , slice 2 BL, slice 2 EL 0, and slice 2 EL 1. Case 2: If only one feedback signal is sent for the image frame 1, only reconstructed images slice 0 EL 1 and slice 1 EL 1 respectively corresponding to image layers having highest quality or resolution in the image frame 2 are stored. In this example, all bitstreams of the slice 2 are lost.

7. A reference frame for a base layer of each slice of the image frame 2 is updated to a corresponding optimal reference frame based on coding reference information in a bitstream of a base layer of the image frame 2, for example, slice 0 EL 1 and slice 1 EL 1. All bitstreams of the slice 2 are lost. The encoder side is notified of this by using a reference signal. An optimal reference frame for the encoder side is not updated for the slice 2. The decoder side is notified of this by using a bitstream. In this case, an optimal reference frame for the decoder side is also not updated for the slice 2.
8. Each updated optimal reference frame is used as a reference frame for a base layer of a corresponding sub-image of an image frame 3, and is used for inter decoding on the base layer of the image frame 3.
9. Bitstreams of the image frame 3 are received and decoded.
10. After the image frame 3 is decoded, Case 1: A feedback signal is sent for each layer of the image frame 3. In other words, a feedback signal is sent each time a bitstream of an image layer is received successfully, or a feedback signal is sent each time a bitstream of an image layer is decoded successfully. Reconstructed images corresponding to all image layers of all sub-images of the image frame 3 are buffered, namely slice 0 BL, slice 0 EL 0, slice 0 EL 1, . . . , slice 1 BL, slice 1 EL 0, slice 1 EL 1, . . . , slice 2 BL, slice 2 EL 0, and slice 2 EL 1. Case 2: If only one feedback signal is sent for the image frame 3, only reconstructed images slice 0 EL 1 and slice 2 EL 1 respectively corresponding to image layers having highest quality or resolution in the image frame 3 are stored. In this example, all bitstreams of the slice 1 are lost.
11. A reference frame for a base layer of each slice of the image frame 3 is updated to a corresponding optimal reference frame based on coding reference information in a bitstream of a base layer of the image frame 3, for example, slice 0 EL 1 and slice 2 EL 1. All bitstreams of the slice 1 are lost. The encoder side is notified of this by using a reference signal. An optimal reference frame for the encoder side is not updated for the slice 1. The decoder side is notified of this by using a bitstream. In this case, an optimal reference frame for the decoder side is also not updated for the slice 1.
12. Each updated optimal reference frame is used as a reference frame for a base layer of a corresponding sub-image of an image frame 4, and is used for inter decoding on the base layer of the image frame 4.

The rest can be deduced by analogy.

Figure 9:
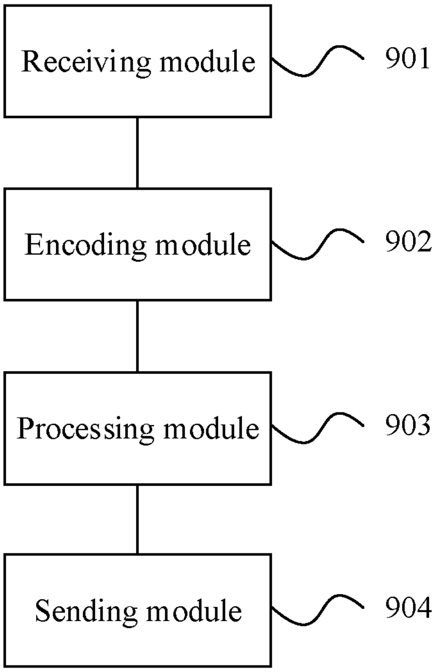
FIG. 9 is a schematic diagram of a structure of an embodiment of an encoding apparatus according to this disclosure.

FIG. 9 is a schematic diagram of a structure of an embodiment of an encoding apparatus according to this disclosure. As shown in FIG. 9, the apparatus in this embodiment may include a receiving module 901, an encoding module 902, a processing module 903, and a sending module 904. The apparatus in this embodiment may be an encoding apparatus or an encoder used on an encoder side.

The receiving module 901 is configured to obtain a to-be-encoded image, where the to-be-encoded image is divided into a base layer and at least one enhancement layer. The encoding module 902 is configured to, when feedback information sent by a decoder side is received, determine a reconstructed image corresponding to a frame sequence number and a layer sequence number indicated in the feedback information as a first reference frame, perform inter encoding on the base layer based on the first reference frame to obtain a bitstream of the base layer, and encode the at least one enhancement layer to obtain a bitstream of the at least one enhancement layer. The sending module 903 is configured to send the bitstream of the base layer and the bitstream of the at least one enhancement layer to the decoder side, where the bitstream of the base layer carries coding reference information, and the coding reference information includes a frame sequence number and a layer sequence number of the first reference frame.

In a possible implementation, the to-be-encoded image is an entire image frame or one sub-image in an entire image frame.

In a possible implementation, when the to-be-encoded image is the one sub-image in the entire image frame, the feedback information further includes location information, and the location information indicates a location of the to-be-encoded sub-image in the entire image frame.

In a possible implementation, the frame sequence number indicates a preceding $n^{th}$ image frame of the to-be-encoded image, and n is a positive integer. The layer sequence number corresponds to an image layer that has highest quality or resolution and that is successfully decoded by the decoder side from a bitstream of the preceding $n^{th}$ image frame of the to-be-encoded image. Alternatively, the layer sequence number corresponds to an image layer that has highest quality or resolution and that is successfully received by the decoder side from a bitstream of the preceding $n^{th}$ image frame of the to-be-encoded image. Alternatively, the layer sequence number corresponds to an image layer that is determined by the decoder side to have highest quality or resolution and that is to be decoded from a bitstream of the preceding $n^{th}$ image frame of the to-be-encoded image.

In a possible implementation, the processing module 902 is further configured to, when the feedback information is not received or the feedback information includes identification information indicating a receiving failure or a decoding failure, perform inter encoding on the base layer based on a third reference frame. The third reference frame is a reference frame for a base layer of a previous image frame of the to-be-encoded image.

In a possible implementation, the processing module 902 is further configured to, when the feedback information is not received or the feedback information includes identification information indicating a receiving failure or a decoding failure, perform intra encoding on the base layer.

In a possible implementation, the encoding module 902 is further configured to perform inter encoding on a first enhancement layer based on a second reference frame to obtain a bitstream of the first enhancement layer. The first enhancement layer is any one of the at least one enhancement layer. The second reference frame is a reconstructed image corresponding to a first image layer. The first image layer has lower quality or resolution than quality or resolution of the any image layer.

In a possible implementation, the first image layer is an image layer lower than the first enhancement layer, or the first image layer is the base layer.

In a possible implementation, the processing module 903 is configured to buffer reconstructed images respectively corresponding to the base layer and the at least one enhancement layer.

In a possible implementation, the processing module 903 is further configured to monitor the feedback information within specified duration, and if the feedback information is received within the specified duration, determine that the feedback information is received.

The apparatus in this embodiment may be configured to execute the technical solutions in the method embodiments shown in FIG. 2 and FIG. 4 to FIG. 8C. Implementation principles and technical effect of the apparatus are similar to those of the method embodiments. Details are not described herein.

Figure 10:
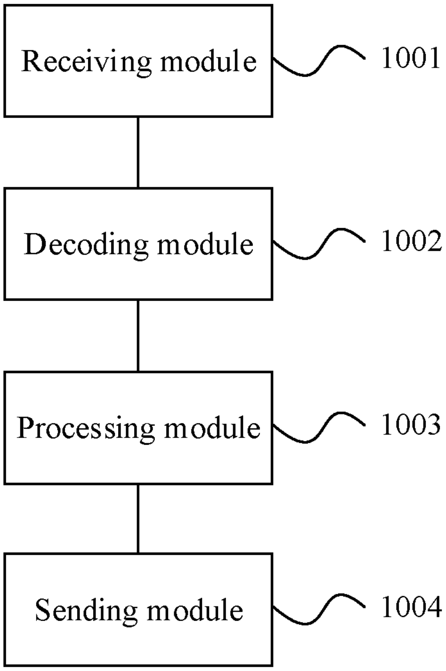
FIG. 10 is a schematic diagram of a structure of an embodiment of a decoding apparatus according to this disclosure.

FIG. 10 is a schematic diagram of a structure of an embodiment of a decoding apparatus according to this disclosure. As shown in FIG. 10, the apparatus in this embodiment may include a receiving module 1001, a decoding module 1002, a processing module 1003, and a sending module 1004. The apparatus in this embodiment may be a decoding apparatus or a decoder used on a decoder side.

The receiving module 1001 is configured to receive, from an encoder side, a bitstream of a base layer and a bitstream of at least one enhancement layer of a to-be-decoded image. The bitstream of the base layer carries coding reference information, and the coding reference information includes a first frame sequence number and a first layer sequence number. The decoding module 1002 is configured to determine a first reference frame based on the first frame sequence number and the first layer sequence number, perform inter decoding on the bitstream of the base layer based on the first reference frame to obtain a reconstructed image corresponding to the base layer, and decode the bitstream of the at least one enhancement layer to obtain a reconstructed image corresponding to the at least one enhancement layer. The sending module 1004 is configured to send feedback information to the encoder side. The feedback information includes a second frame sequence number and a second layer sequence number. The second frame sequence number corresponds to the to-be-decoded image. The second layer sequence number corresponds to an image layer having highest quality or resolution.

In a possible implementation, the to-be-decoded image is an entire image frame or one sub-image in an entire image frame.

In a possible implementation, when the to-be-decoded image is the one sub-image in the entire image frame, the feedback information further includes location information, and the location information indicates a location of the to-be-decoded image in the entire image frame.

In a possible implementation, that the second layer sequence number corresponds to an image layer having highest quality or resolution in the base layer and the at least one enhancement layer of the to-be-decoded image further includes that the second layer sequence number corresponds to an image layer that has highest quality or resolution and that is successfully decoded from the bitstream of the base layer and the bitstream of the at least one enhancement layer of the to-be-decoded image, the second layer sequence number corresponds to an image layer that has highest quality or resolution and that is successfully received from the bitstream of the base layer and the bitstream of the at least one enhancement layer of the to-be-decoded image, or the second layer sequence number corresponds to an image layer that is currently determined to have highest quality or resolution and that is to be decoded from the bitstream of the base layer and the bitstream of the at least one enhancement layer of the to-be-decoded image.

In a possible implementation, when both the bitstream of the base layer and the bitstream of the at least one enhancement layer fail to be received, the feedback information includes identification information indicating a receiving failure. Alternatively, when the bitstream of the base layer and/or the bitstream of the at least one enhancement layer fail/fails to be decoded, the feedback information includes identification information indicating a decoding failure.

In a possible implementation, the decoding module 1002 is further configured to obtain the to-be-decoded image based on the reconstructed image corresponding to the base layer and the reconstructed image corresponding to the at least one enhancement layer.

In a possible implementation, the decoding module 1002 is further configured to perform inter decoding on a bitstream of a first enhancement layer based on a second reference frame to obtain a reconstructed image corresponding to the first enhancement layer. The first enhancement layer is any one of the at least one enhancement layer. The second reference frame is a reconstructed image corresponding to a first image layer. The first image layer has lower quality or resolution than quality or resolution of the first enhancement layer.

In a possible implementation, the first image layer is an image layer lower than the first enhancement layer, or the first image layer is the base layer.

In a possible implementation, the processing module 1003 is configured to, when the feedback information includes frame sequence numbers and layer sequence numbers of all image layers that are successfully decoded, to be decoded, or successfully received, buffer reconstructed images corresponding to all the image layers, or when the feedback information includes a frame sequence number and a layer sequence number of an image layer that has highest quality or resolution and that is successfully decoded, to be decoded, or successfully received, buffer a reconstructed image corresponding to the image layer that has highest quality or resolution and that is successfully decoded, to be decoded, or successfully received.

In a possible implementation, the decoding module 1002 is further configured to, when the bitstream of the base layer and/or the bitstream of the at least one enhancement layer include/includes coding scheme indication information, decode a corresponding image layer according to a scheme indicated in the coding scheme indication information. The scheme indicated in the coding scheme indication information includes intra decoding or inter decoding.

The apparatus in this embodiment may be configured to execute the technical solutions in the method embodiments shown in FIG. 3 to FIG. 8C. Implementation principles and technical effect of the apparatus are similar to those of the method embodiments. Details are not described herein.

In an implementation process, steps in the foregoing method embodiments can be implemented by using a hardware integrated logic circuit in a processor, or by using instructions in a form of software. The processor may be a general-purpose processor, a DSP, an ASIC, an FPGA or another programmable logic device, a discrete gate or transistor logic device, or a discrete hardware component. The general-purpose processor may be a microprocessor, any conventional processor, or the like. The steps of the methods disclosed in embodiments of this disclosure may be directly presented as being performed and completed by a hardware encoding processor, or performed and completed by a combination of hardware and a software module in an encoding processor. The software module may be located in a mature storage medium in the art, such as a RAM, a flash memory, a ROM, a programmable ROM (PROM), an EEPROM, or a register. The storage medium is located in the memory, and the processor reads information in the memory and completes the steps of the method in combination with hardware of the processor.

The memory in the foregoing embodiments may be a volatile memory or a non-volatile memory, or may include both a volatile memory and a non-volatile memory. The non-volatile memory may be a ROM, a PROM, an erasable PROM (EPROM), an EEPROM, or a flash memory. The volatile memory may be a RAM that is used as an external buffer. Through example but not limitative description, RAMs in many forms may be used, for example, a static RAM (SRAM), a dynamic RAM (DRAM), a synchronous DRAM (SDRAM), a double data rate (DDR) SDRAM, an enhanced SDRAM (ESDRAM), a synchlink DRAM (SL-DRAM), and a direct rambus (DR) RAM. It should be noted that the memory in the system and the method described in this specification is intended to include but is not limited to these memories and any memory of another proper type.

A person of ordinary skill in the art may be aware that, the units and algorithm steps in the examples described with reference to embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer software product is stored in a storage medium, and includes several instructions to enable a computer device (which may be a personal computer, a server, a network device, or the like) to perform all or some of the steps of the method described in embodiments of this disclosure. The foregoing storage medium includes: any medium that can store program code, such as a Universal Serial Bus (USB) flash drive, a removable hard disk, a ROM, a RAM, a magnetic disk, or a compact disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method, comprising:

obtaining a to-be-encoded image, wherein the to-be-encoded image is divided into a first base layer and at least one enhancement layer, and wherein the to-be-encoded image is a sub-image in an entire image frame;

determining, when receiving feedback information from a decoder side, a reconstructed image corresponding to a first frame sequence number and a first layer sequence number indicated in the feedback information as a first reference frame, wherein the feedback information comprises location information indicating a location of the sub-image in the entire image frame, wherein the location information comprises at least one of a start location of the sub-image in the entire image frame, a sequence number of the sub-image among a plurality of sub-images in the entire image frame, or a dimension of the sub-image;

performing inter encoding on the first base layer based on the first reference frame to obtain a first bitstream of the first base layer, wherein the first bitstream carries coding reference information, and wherein the coding reference information comprises a second frame sequence number of the first reference frame and a second layer sequence number of the first reference frame;

encoding the at least one enhancement layer to obtain a second bitstream of the at least one enhancement layer; and sending the first bitstream and the second bitstream to the decoder side.

2. The method of claim 1, wherein the decoder side determines the first layer sequence number based on an actual reception status or a decoding status of the decoder side, wherein the first frame sequence number indicates a preceding $n^{th}$ image frame of the to-be-encoded image, wherein n is a positive integer, and wherein the first layer sequence number corresponds to:

an image layer that has highest quality or resolution and that is successfully decoded by the decoder side from a bitstream of the preceding $n^{th}$ image frame of the to-be-encoded image;

an image layer that has highest quality or resolution and that is successfully received by the decoder side from a bitstream of the preceding $n^{th}$ image frame of the to-be-encoded image; or an image layer that is determined by the decoder side to have highest quality or resolution and that is to be decoded from a bitstream of the preceding $n^{th}$ image frame of the to-be-encoded image.

3. The method of claim 1, wherein after obtaining the to-be-encoded image, the method further comprises performing, when the feedback information is not received or the feedback information comprises identification information indicating a receiving failure or a decoding failure, inter encoding on the first base layer based on a third reference frame, wherein the third reference frame is for a second base layer of a previous image frame of the to-be-encoded image.

4. The method of claim 1, wherein after obtaining the to-be-encoded image, the method further comprises performing, when the feedback information is not received or the feedback information comprises identification information indicating a receiving failure or a decoding failure, intra encoding on the first base layer.

5. The method of claim 1, wherein encoding the at least one enhancement layer comprises performing inter encoding on a first enhancement layer based on a second reference frame to obtain a third bitstream of the first enhancement layer, wherein the first enhancement layer is any one of the at least one enhancement layer, wherein the second reference frame is a second reconstructed image corresponding to a first image layer, and wherein a quality or a resolution of the first image layer is lower than a quality or a resolution of the first enhancement layer.

6. The method of claim 5, wherein the first image layer is lower than the first enhancement layer or is the first base layer.

7. The method of claim 5, wherein during encoding the at least one enhancement layer, the method further comprises buffering reconstructed images corresponding to the first base layer and the at least one enhancement layer.

8. The method of claim 1, wherein before determining the reconstructed image, the method further comprises:

monitoring the feedback information within a specified duration; and determining, when the feedback information is received within the specified duration, that the feedback information is received.

9. The method of claim 1, wherein the first frame sequence number indicates a preceding $n^{th}$ image frame of the to-be-encoded image, wherein n is a positive integer, wherein the sub-image is one of the plurality of sub-images in the entire image frame, wherein each of the sub-images correspond to one of a plurality of layer sequence numbers, wherein the first reference frame comprises the layer sequence numbers, and wherein each of the layer sequence numbers corresponds to:

an image layer that has highest quality or resolution and that is successfully decoded by the decoder side from a bitstream of the preceding $n^{th}$ image frame of the corresponding sub-image;

an image layer that has highest quality or resolution and that is successfully received by the decoder side from a bitstream of the preceding $n^{th}$ image frame of the corresponding sub-image; or an image layer that is determined by the decoder side to have highest quality or resolution and that is to be decoded from a bitstream of the preceding $n^{th}$ image frame of the corresponding sub-image.

10. The method of claim 1, wherein the first frame sequence number indicates a preceding $n^{th}$ image frame of the to-be-encoded image, wherein n is a positive integer, and wherein the first layer sequence number corresponds to an image layer that has highest quality or resolution and that is successfully decoded by the decoder side from a bitstream of the preceding $n^{th}$ image frame of the to-be-encoded image.

11. The method of claim 1, wherein the location information comprises the start location of the sub-image in the entire image frame.

12. The method of claim 1, wherein the location information comprises the sequence number of the sub-image identifying the sub-image among the plurality of sub-images.

13. The method of claim 1, wherein the location information comprises a width or a height of the sub-image.

14. A source device encoder comprising:

a memory configured to store instructions; and one or more processors coupled to the memory and configured to execute the instructions to cause the source device encoder to:

obtain a to-be-encoded image, wherein the to-be-encoded image is divided into a first base layer and at least one enhancement layer, and wherein the to-be-encoded image is a sub-image in an entire image frame;

determine, when receiving feedback information from a decoder side, a reconstructed image corresponding to a first frame sequence number and a first layer sequence number indicated in the feedback information as a first reference frame, wherein the feedback information comprises location information indicating a location of the sub-image in the entire image frame, wherein the location information comprises at least one of a start location of the sub-image in the entire image frame, a sequence number of the sub-image among a plurality of sub-images in the entire image frame, or a dimension of the sub-image;

perform inter encoding on the first base layer based on the first reference frame to obtain a first bitstream of the first base layer, wherein the first bitstream carries coding reference information, and wherein the coding reference information comprises a second frame sequence number of the first reference frame and a second layer sequence number of the first reference frame;

encode the at least one enhancement layer to obtain a second bitstream of the at least one enhancement layer; and send the first bitstream and the second bitstream to the decoder side.

15. The source device encoder of claim 14, wherein the decoder side determines the first layer sequence number based on an actual reception status or a decoding status of the decoder side, wherein the first frame sequence number indicates a preceding $n^{th}$ image frame of the to-be-encoded image, wherein n is a positive integer, and wherein the first layer sequence number corresponds to:

an image layer that has highest quality or resolution and that is successfully decoded by the decoder side from a bitstream of the preceding $n^{th}$ image frame of the to-be-encoded image;

an image layer that has highest quality or resolution and that is successfully received by the decoder side from a bitstream of the preceding $n^{th}$ image frame of the to-be-encoded image; or an image layer that is determined by the decoder side to have highest quality or resolution and that is to be decoded from a bitstream of the preceding $n^{th}$ image frame of the to-be-encoded image.

16. The source device encoder of claim 14, wherein after obtaining the to-be-encoded image, the one or more processors are further configured to execute the instructions to cause the source device encoder to perform, when the feedback information is not received or the feedback information comprises identification information indicating a receiving failure or a decoding failure, inter encoding on the first base layer based on a third reference frame, wherein the third reference frame is for a second base layer of a previous image frame of the to-be-encoded image.

17. The source device encoder of claim 14, wherein after obtaining the to-be-encoded image, the one or more processors are further configured to execute the instructions to cause the source device encoder to perform, when the feedback information is not received or the feedback information comprises identification information indicating a receiving failure or a decoding failure, intra encoding on the first base layer.

18. The source device encoder of claim 14, wherein the one or more processors are further configured to execute the instructions to cause the source device encoder to encode the at least one enhancement layer by performing inter encoding on a first enhancement layer based on a second reference frame to obtain a third bitstream of the first enhancement layer, wherein the first enhancement layer is any one of the at least one enhancement layer, wherein the second reference frame is a second reconstructed image corresponding to a first image layer, and wherein a quality or a resolution of the first image layer is lower than a quality or a resolution of the first enhancement layer.

19. The source device encoder of claim 18, wherein the first image layer is lower than the first enhancement layer or is the first base layer.

20. The source device encoder of claim 18, wherein during encoding the at least one enhancement layer, the one or more processors are further configured to execute the instructions to cause the source device encoder to buffer reconstructed images corresponding to the first base layer and the at least one enhancement layer.

21. The source device encoder of claim 14, wherein before determining the reconstructed image, the one or more processors are further configured to execute the instructions to cause the source device encoder to:

monitor the feedback information within a specified duration; and determine, when the feedback information is received within the specified duration, that the feedback information is received.

22. The source device encoder of claim 14, wherein the first frame sequence number indicates a preceding $n^{th}$ image frame of the to-be-encoded image, wherein n is a positive integer, wherein the sub-image is one of the plurality of sub-images in the entire image frame, wherein each of the sub-images correspond to one of a plurality of layer sequence numbers, wherein the first reference frame comprises the layer sequence numbers, and wherein each of the layer sequence numbers corresponds to:

an image layer that has highest quality or resolution and that is successfully decoded by the decoder side from a bitstream of the preceding $n^{th}$ image frame of the corresponding sub-image;

an image layer that has highest quality or resolution and that is successfully received by the decoder side from a bitstream of the preceding $n^{th}$ image frame of the corresponding sub-image; or an image layer that is determined by the decoder side to have highest quality or resolution and that is to be decoded from a bitstream of the preceding $n^{th}$ image frame of the corresponding sub-image.

* * * * *